(12) United States Patent
Andrews et al.

(10) Patent No.: US 7,047,426 B1
(45) Date of Patent: May 16, 2006

(54) PORTABLE COMPUTING DEVICE COMMUNICATION SYSTEM AND METHOD

(75) Inventors: Randy A. Andrews, West Linn, OR (US); Corwyn C. Bolton, Portland, OR (US)

(73) Assignee: Warranty Corporation of America, Norcross, GA (US)

( * ) Notice: Subject to any disclaimer, the term of this patent is extended or adjusted under 35 U.S.C. 154(b) by 0 days.

(21) Appl. No.: 09/560,873

(22) Filed: Apr. 27, 2000

(51) Int. Cl.
    *G06F 17/00* (2006.01)

(52) U.S. Cl. ...................... 713/201; 713/200; 713/155; 713/168

(58) Field of Classification Search ......... 713/200–202, 713/150–158, 168, 176, 179; 380/255–257
See application file for complete search history.

(56) References Cited

U.S. PATENT DOCUMENTS

| | | | |
|---|---|---|---|
| 5,715,174 A | | 2/1998 | Cotichini et al. |
| 5,764,892 A | | 6/1998 | Cain et al. |
| 5,802,280 A | | 9/1998 | Cotichini et al. |
| 6,249,868 B1 | * | 6/2001 | Sherman et al. ............ 713/168 |
| 6,304,969 B1 | * | 10/2001 | Wasserman et al. ........ 713/172 |
| 6,643,781 B1 | * | 11/2003 | Merriam ..................... 713/201 |

OTHER PUBLICATIONS http://www.computersecurity.com/laptop/.*
WANTED: a theft–deterrent solution for the pervasive computing world□□Droz, P.; Gulcu,C.; Haas, R.;□□Computer Communications and Networks, 2000. Proceedings. Ninth International Conference on, Oct. 16–18, 2000 □□pp.:374–379.*
http://www.stealthsignal.com/www/index.asp?var_lang=en&var_country=us.*

* cited by examiner

*Primary Examiner*—David Jung
(74) *Attorney, Agent, or Firm*—Kolisch Hartwell, P.C.

(57) ABSTRACT

A method of communicating between a portable computing device and a host computer is provided. The method typically includes storing a responsive action to be taken in the event that the portable computing device becomes missing. Typically, the responsive action is stored at a location accessible by the host computer, such as on an associated database. The method also includes registering the portable computing device as having a missing status, establishing contact between the portable computing device and the host computer via a communication network, and instructing the portable computing device to take the responsive action. The method may include before registering the portable computing device as having a missing status, receiving a report from an interest holder in the portable computing device that the portable computing device is missing, and storing the missing status in a database associated with the host computer. The responsive action may be retrieving or deleting data from the portable computing device, restricting user access to the portable computing device, and/or tracking the location of the portable computing device.

62 Claims, 17 Drawing Sheets

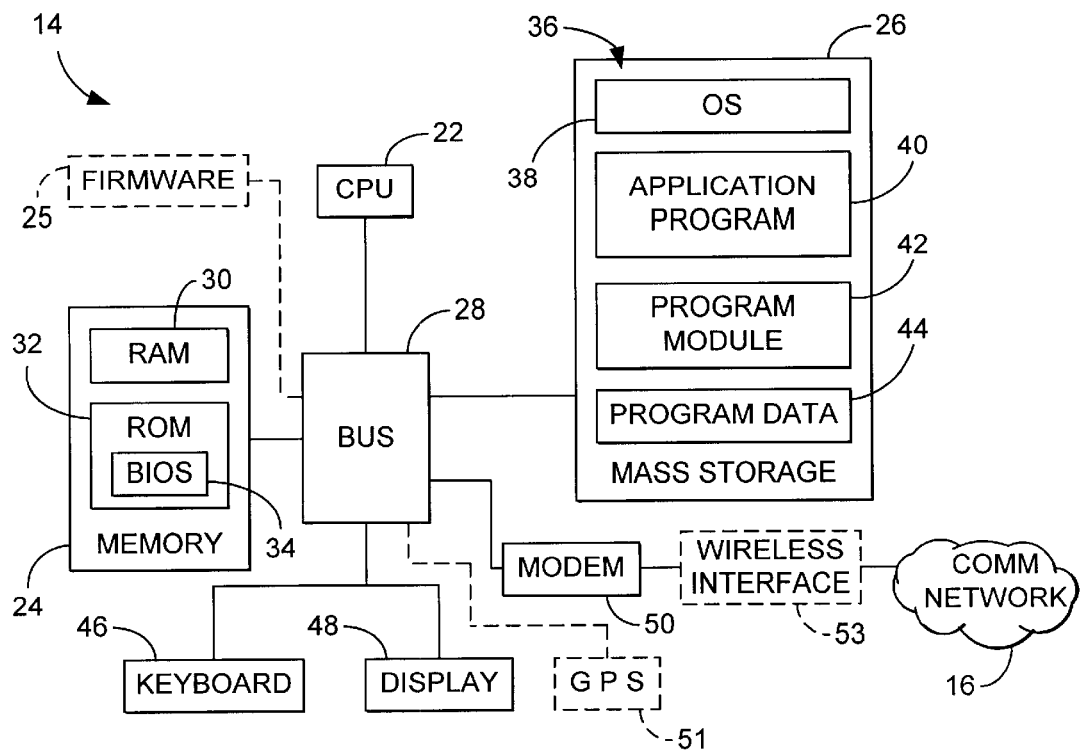
FIG. 2
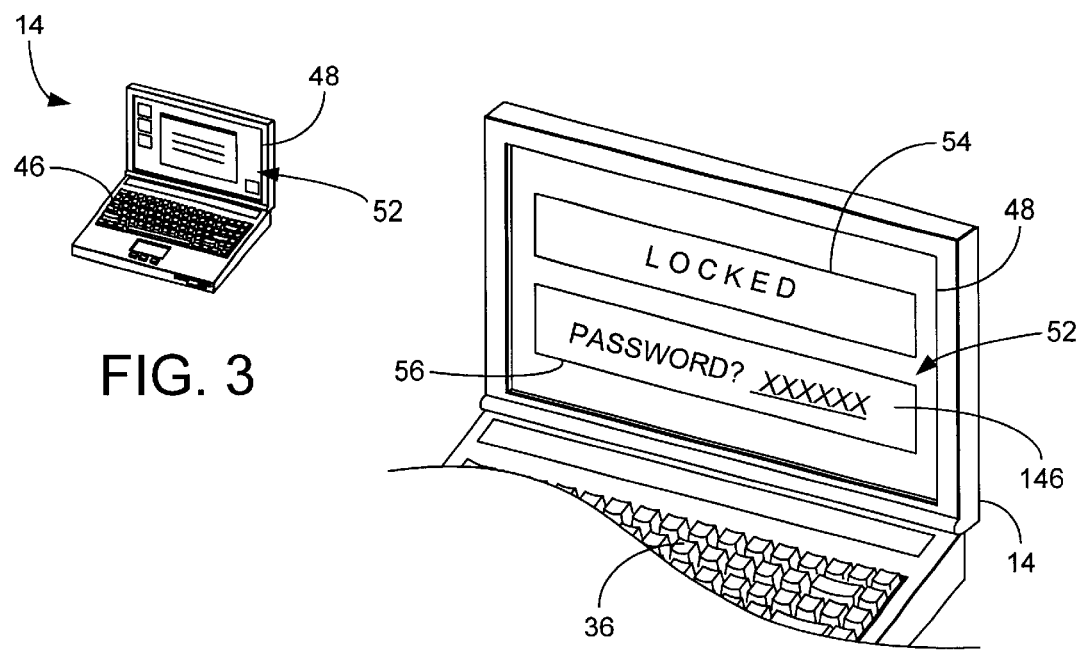
FIG. 3
FIG. 4

| | | |
|---|---|---|
| 122 | Client ID | 12345 |
| 124 | Product Identifier | Security Product A |
| 126 | User name | Jane Doe |
| 128 | User gender | Female |
| 130 | User demographic information<br>   Income range —132<br>   Employment type —134<br>   User interests —136 | $XXXXXX-XXXXXX/year<br>professional<br>automobile repair, sports, current events |
| 140 | User address | 123 1st St. Anycity, Anystate |
| 142 | User phone number | (XXX) XXX-XXXX |
| 144 | User email address | doe@email.address |
| 146 | User password | XXXXX |
| 148 | Status (NORMAL, MISSING, LOST, STOLEN, UNAUTHORIZED USE, MESSAGE QUEUED, PAYMENT DUE, DELINQUENT) | MISSING; DELINQUENT |
| 150 | Action (RETRIEVE FILE, DELETE FILE, LOCK-UP DEVICE, TRACK LOCATION, SEND MESSAGE, DOWNLOAD FILE, EXECUTE FILE, SEND BILL, SEND PAYMENT REMINDER) | |
| 152 |    MISSING ACTION | TRACK LOCATION |
| 154 |    LOST ACTION | RETRIEVE FILES; DELETE FILES |
| 156 |    STOLEN ACTION | RETRIEVE FILES; DELETE FILES; LOCK-UP COMPUTER |
| 158 |    MESSAGE QUEUED ACTION | SEND MESSAGE |
| 160 |    PAYMENT DUE ACTION | SEND BILL |
| 162 |    DELINQUENT ACTION | SEND PAYMENT REMINDER |
| 164 | File to retrieve indicators | C:\files\importantfile.doc,<br>c:\files\importantfolder\   164a<br>"*file.doc" |
| 166 | File to delete indicators | c:\files\importantfile.doc,<br>c:\files\importantfolder\,   166a<br>"sensitivefile.doc" |
| 168 | Software/Hardware Config. | ModemXXX-XX; WINDOWS OS |
| 170 | Contact history<br>   Telephone number<br>   (Geographic location) | (XXX) XXX-XXXX (City 1)<br>(YYY) YYY-YYYY (City 2)<br>(ZZZ) ZZZ-ZZZZ (City 3) |
| 176 | Contact schedule<br>178 —Most recent contact time<br>180 —Contact interval<br>182 —Next scheduled contact time<br>184 —Next contact telephone no.<br>186 —Backup telephone no.<br>188 —Attempt interval | <br>Dec 27, 20XX, 12:01 PST<br>5 days<br>Jan 1, 20XX, 12:01 PST<br>(800) XXX-XXXX<br>(800) XXX-XXXX<br>15 minutes |

FIG. 7

PORTABLE COMPUTING DEVICE COMMUNICATION SYSTEM AND METHOD

TECHNICAL FIELD

This invention relates generally to computing devices, and more particularly to a portable computing device communication system and method.

BACKGROUND OF THE INVENTION

Portable computing devices, such as laptop computers, personal data assistants (PDAs), palmtop computers, etc., have become increasingly popular in recent years. Portable computing devices enable users to make efficient use of travel and commuting time, and to work while away from the office. To increase productivity and promote quality of work-life, many companies provide portable computing devices to their employees.

One problem with portable computing devices is that the portable nature of such devices makes them particularly susceptible to loss and theft. Portable computing devices routinely are reported lost or stolen in airport terminals, hotel lobbies, and workplaces. The computing device itself is a tangible asset that is expensive to replace. In addition, the value of the data stored on a lost or stolen portable computing device may eclipse the value of the device itself. Further, such data may be of a sensitive nature, and public disclosure of the data may have detrimental consequences for its owner. Therefore, recovery of the tangible device, recovery of the data stored thereon, and prevention of public disclosure of such data are all high priorities for owners whose portable computing devices are lost or stolen.

Another problem with portable computing devices is that companies often have difficulty keeping track of company-owned portable computing devices. These devices are easy for employees to take from place to place within the company, trade with other employees, or take home, on vacation, or on business trips. When an employee leaves the company for other employment opportunities, the employee may fail to return a company-owned portable computing device, particularly when the device has been used at the employee's home. It is easy for the company to lose track of who is using a particular device or where the device is located, making internal asset tracking and loss prevention problematic.

Increasingly, consumers are leasing portable computing devices, or purchasing the devices on credit. One problem creditors experience is that the portable computing devices are difficult to recover from delinquent customers, because delinquent customers often avoid contact with their creditors. In addition, leased computers may be lost or stolen, and become difficult for creditors to locate.

Another related problem is that entities that own fleets of portable computing devices often desire to communicate with the many users of the fleet. Conventional communication methods, such as email, suffer from the drawback that the company must maintain current email addresses for every user, and rely upon the user to read the email. User addresses frequently change, and the entity may lose track of the user. In addition, the user may delete an email without reading it. This makes it difficult for the entity to confirm that a particular message was read by a particular user.

SUMMARY OF THE INVENTION

According to a preferred embodiment of the present invention, a method of communicating between a portable computing device and a host computer is provided. The method typically includes storing a responsive action to be taken in the event that the portable computing device becomes missing. Typically, the responsive action is stored at a location accessible by the host computer, such as on an associated database. The method also includes registering the portable computing device as having a missing status, establishing contact between the portable computing device and the host computer via a communication network, and instructing the portable computing device to take the responsive action. The method may include before registering the portable computing device as having a missing status, receiving a report from an interest holder in the portable computing device that the portable computing device is missing, and storing the missing status in a database associated with the host computer. The responsive action may be retrieving or deleting data from the portable computing device, restricting user access to the portable computing device, and/or tracking the location of the portable computing device.

According to another preferred embodiment of the present invention, another method of communicating between a portable computing device and a host computer is provided. The method typically includes determining a contact schedule, and configuring the portable computing device and host computer to establish contact via a communication network periodically according to the contact schedule. The method also includes receiving from an interest holder in the portable computing device a responsive action to be taken in the event that the portable computing device has a predetermined status, and storing the responsive action in a location accessible by host computer. The method further includes receiving from the interest holder a report that the portable computing device has the predetermined status, and registering the portable computing device as having the predetermined status in a database associated with the host computer. The method also includes establishing contact between the portable computing device and the host computer via a communication network according to the contact schedule, and instructing the portable computing device to take the responsive action.

According to another preferred embodiment of the invention, a method for communicating between a host computer and a portable computing device is provided. The method typically includes determining a contact schedule and configuring the portable computing device to contact the host computer via a communication network according to the contact schedule. The method also includes at the host, registering a status related to the portable computing device, and establishing contact between the portable computing device and the host computer via a communication network, according to the contact schedule. The method further includes selecting a file to download based upon the status, downloading a file from the host computer to the portable computing device, and without user intervention, handling the file at the client in a predetermined manner. Handling the file may include opening the downloaded file with an associated application program on the portable computing device, or may include executing the file on the portable computing device.

According to another preferred embodiment of the present invention, a method of restricting access to a computing device is provided. The method includes executing a launch program on the computing device, executing a screen-blocking program from the launch program, limiting user access to the computing device with the screen-blocking program, and requesting a password from a user of the computing device. If the user provides the password, the method includes exiting the screen-blocking program and launch program and allowing the user access to the computing device. If the screen-blocking program is exited by the user other than by use of a password, the method includes substantially immediately restarting the screen-blocking program from the launch program. The computing device may include an operating system having a registry, and the launch program may be a service registered in the registry.

According to another preferred embodiment of the present invention, a method of communicating between a host computer and a client computing device is provided. The client computing device includes an operating system having a graphical user interface with a task bar. The method typically includes downloading a file from the host computer to the client computing device via a communication network, and opening the file directly to the task bar without user intervention. During downloading and opening the file directly to the task bar, the method may provide that the file never is viewable in an unminimized window on the graphical user interface of the client computing device.

According to another preferred embodiment of the present invention, a method for communicating between a host computer and a portable computing device is provided, wherein the portable computing device is consecutively positioned in a plurality of geographic locations. The method typically includes determining a contact schedule and configuring the portable computing device to be connectable to a telephone network from more than one of the geographic locations. The method also includes configuring the host computer and the portable computing device to repeatedly establish contact between each other according to the contact schedule. The contact may be via a direct call between the host computer and the portable computing device placed over the telephone network. The telephone network may be the public switched telephone network (PSTN).

BRIEF DESCRIPTION OF THE DRAWINGS

FIG. 2 is a schematic view of a portable computing device of the communication system of FIG. 1.

FIG. 3 is an isometric view of the portable computing device of FIG. 2.

FIG. 4 is an isometric view of a portion of the portable computing device of FIG. 2, showing a locked display.

FIG. 7 is a client data record stored on a database associated with the host computer of the communication system of FIG. 1.

DETAILED DESCRIPTION OF THE PREFERRED EMBODIMENTS

Figure 1:
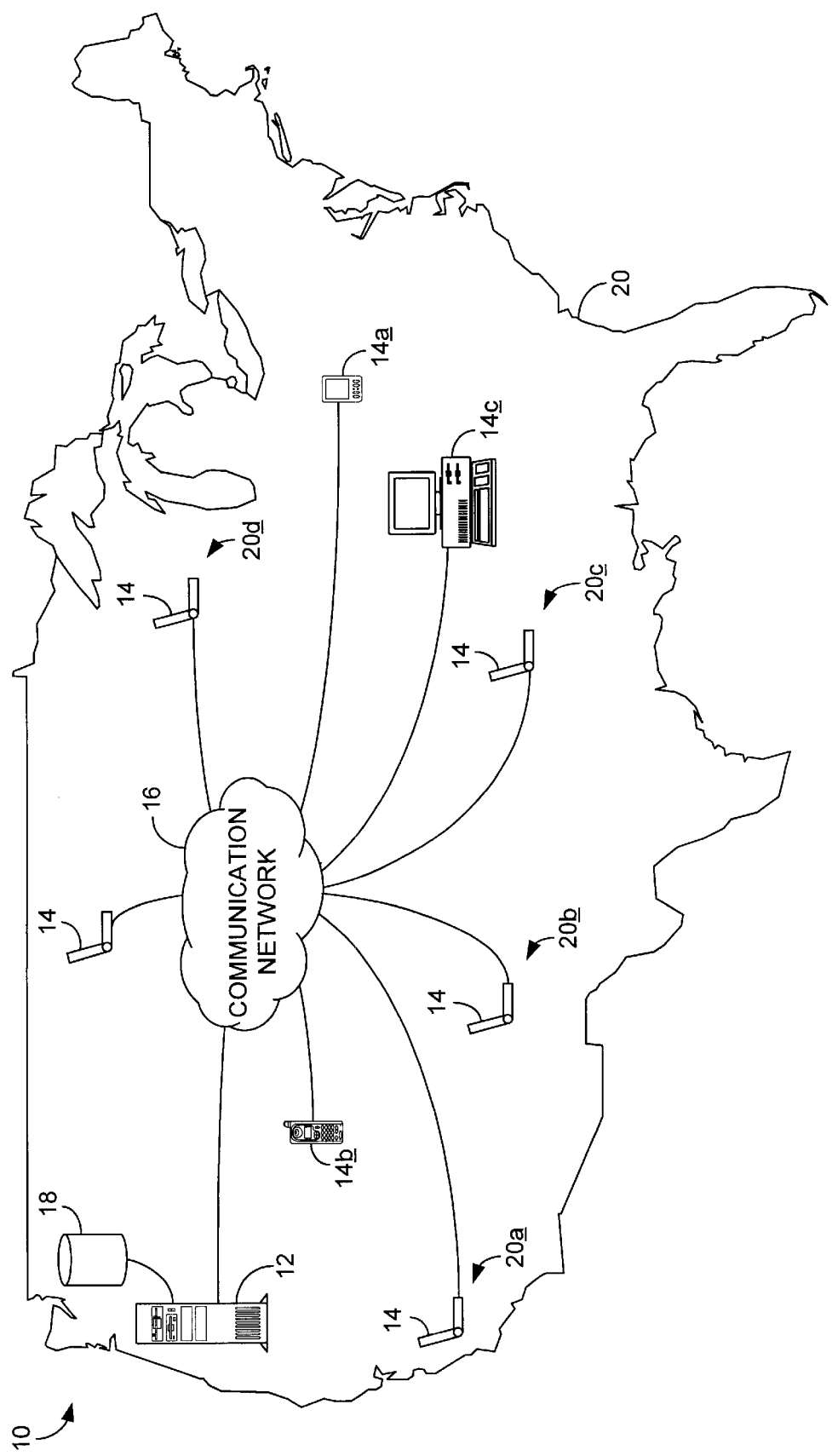
FIG. 1 is a schematic view of a communication system according to one preferred embodiment of the present invention.
Figure 5:
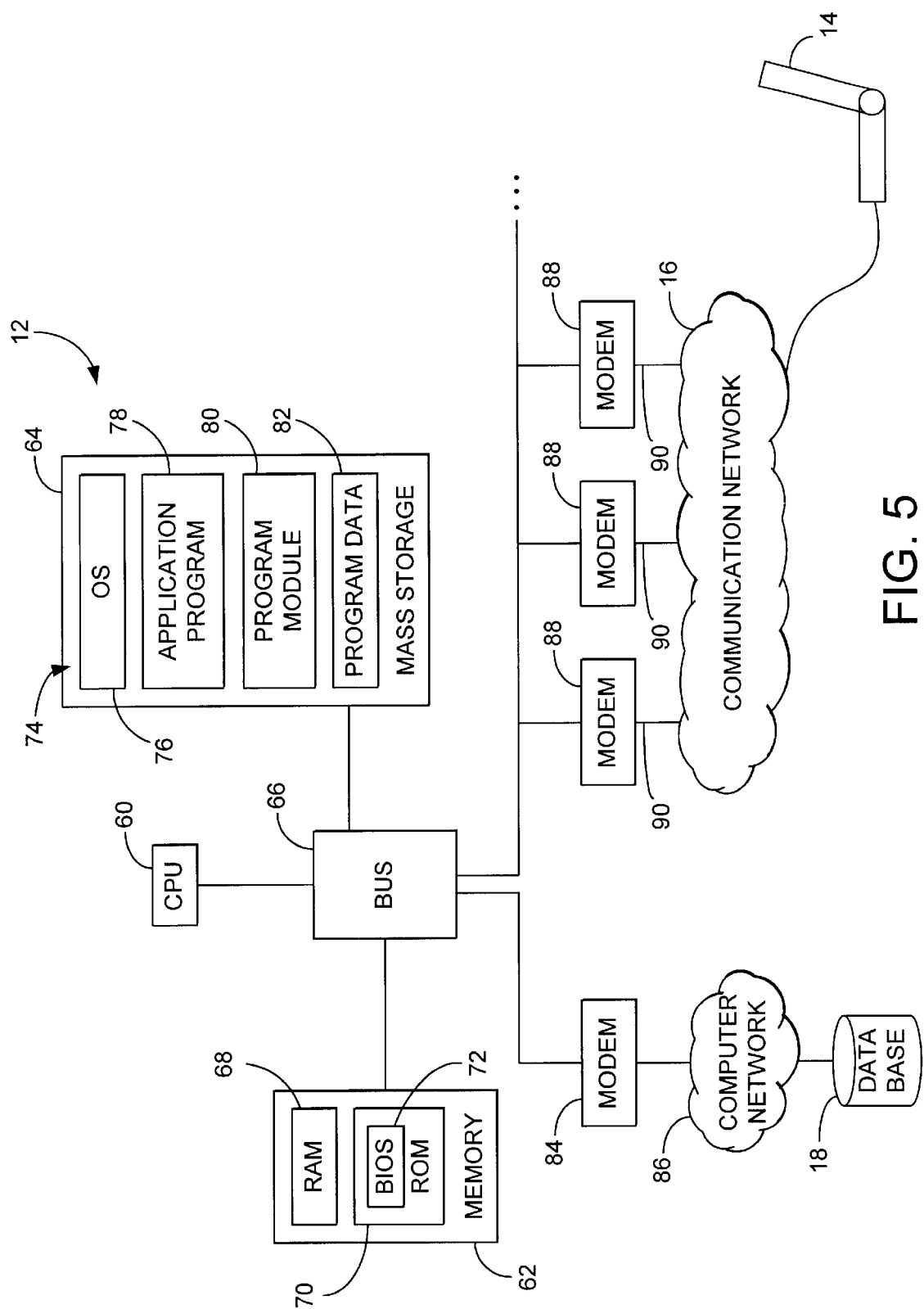
FIG. 5 is a schematic view of a host computer of the communication system of FIG. 1
Figure 6:
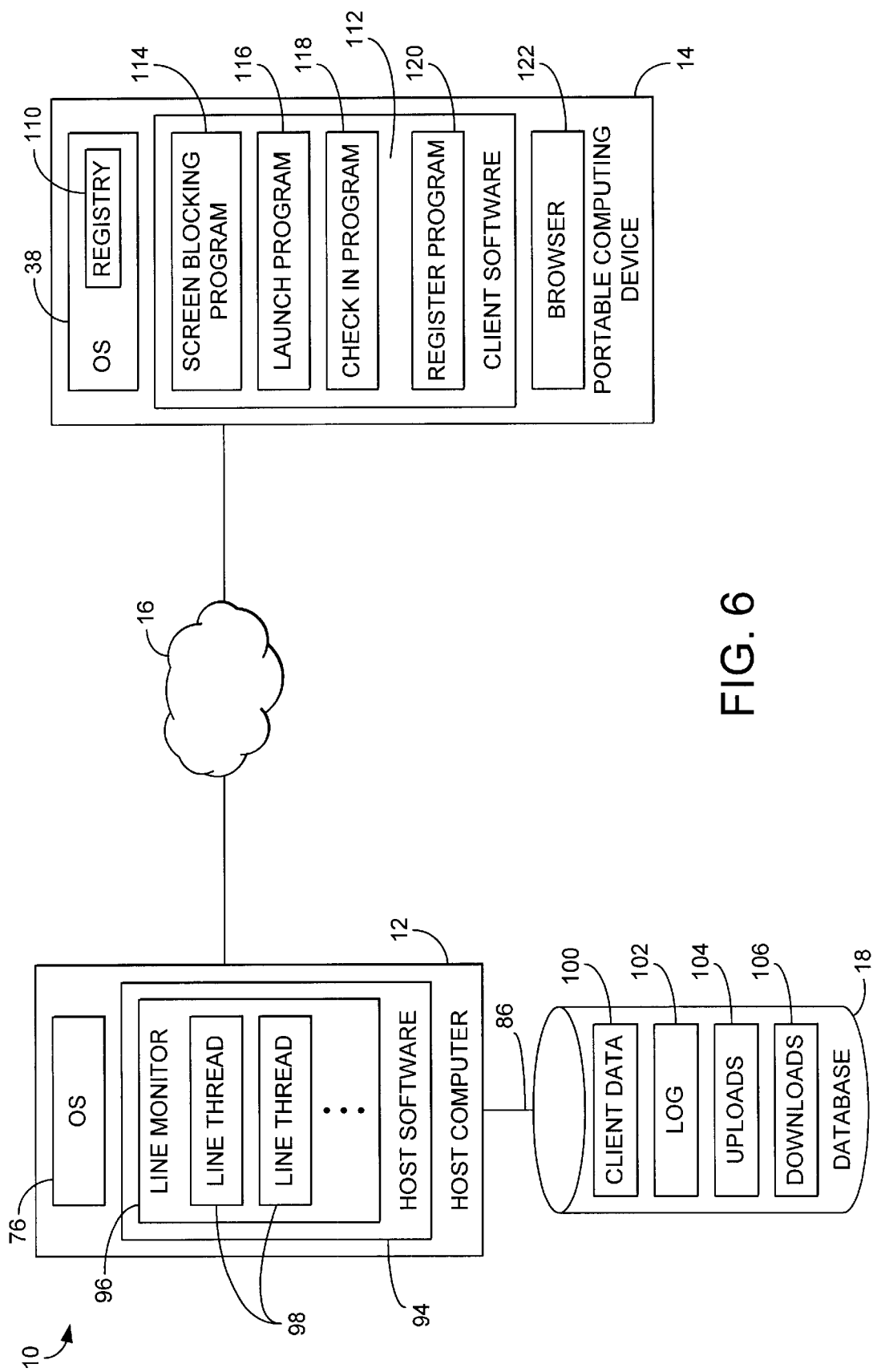
FIG. 6 is a schematic view of software executed by the communication system of FIG. 1.

Referring now to FIG. 1, a communication system according to one embodiment of the present invention is shown generally at 10. System 10 includes a host computer 12 and one or more client computing devices 14 positioned within geographic region 20. Host computer 12 and each client computing device 14 are configured to establish contact periodically via a communication network 16. Host computer 12 is also linked to an associated database 18.

Communication network 16 is typically a telephone network such as the public switched telephone network (PSTN), and portable computing devices 14 each are configured to establish contact with host computer 12 via a direct dial connection through the telephone network. Alternatively, communication network 16 may be a local area network (LAN), or wide area network (WAN) such as the Internet. In addition, communication network 16 may be a wireless network such as a cellular or satellite network. For example, communications network 16 may be the world satellite service formerly offered by Iridium, LLC of Washington, D.C.

Typically, client computing device 14 is a portable computing device 14 such as a laptop computer. Alternatively, portable computing device 14 may be a personal data assistant (PDA) 14a, cellular phone 14b, or virtually any other portable computing device configured to establish contact with host computer 12 via communication network 16 from a plurality of geographic locations. For example, portable computing device 14 may be a Magellan GSC 100 global satellite communicator, commercially available from Magellan Corporation of Santa Clara, Calif. In addition, portable computing device 14 may be a web-enabled wireless phone such as the "i1000 plus" wireless phone available from Motorola Corporation of Schaumburg, Ill., configured to run the "UP" web browser available from Phone.com, Inc., of Redwood City, Calif. Alternatively, the client computing device 14 may be a desktop computer 14c, or other computing device, and may not be portable.

Portable computing device 14 is configured to be taken from place to place by a user over time. Portable computing device 14 also typically is configured to access communication network 16 periodically according to a predetermined contact schedule and connect to host computer 12. The contact is typically automatically initiated by portable computing device 14, without user intervention. Thus, as a user travels with a portable computing device 14d from place to place, the device 14d may access communication network 16 and contact host computer 12 from each of a plurality of geographic locations 20a–20c. Typically, this occurs as the user connects the portable computing device 14d to a telephone jack in each of geographic locations 20a–20c for other purposes, such as to check an email account or dial an Internet Service Provider. When not engaged in user-initiated modem activity, the portable computing device is configured to connect to the telephone network surreptitiously and contact host computer 12. Alternatively, the portable computing device may be configured to connect to a satellite, wireless, or other network surreptitiously. Although the contact is preferably surreptitious, it will be understood that surreptitious contact is not required, particularly when the client software is not used as a security product, as described below.

As shown in FIG. 2, portable computing device 14 typically includes a central processing unit 22, memory 24, a mass storage device 26, each linked to a bus 28. The mass storage device may be a hard drive, CD ROM drive, magnetic disk drive, tape drive, or other device. Mass storage device 26 may also be flash memory, and/or device 14 may include firmware 25, particularly where portable computing device 14 is a PDA or cellular phone.

Memory 24 typically includes random access memory (RAM) 30, read only memory (ROM) 32, and a basic input output system (BIOS) 34, which contains software routines necessary to start-up and operate portable computing device 14. Computer-readable data 36, such as an operating system 38, application program 40, program module 42, and program data 44 are typically stored on mass storage device 26, or in memory 24.

Portable computing device 14 also typically includes a keyboard 46 and display 48, and a modem 50 configured to enable the device to communicate with the host computer 12 through communication network 16. Typically, modem 50 is a telephone modem. Alternatively, the modem may be an Integrated Services Digital Network (ISDN) modem, Digital Subscriber Line (DSL) modem, cable modem, wireless modem, satellite modem, or other suitable type of modem. Modem 50 may have an associated wireless interface device 53, such as a satellite transceiver, cellular transceiver, or other wireless transceiver. For example, modem 50 may be a Magellan Satellite Modem, available from Magellan Corporation of Santa Clara, Calif., which includes a satellite transceiver configured to send and receive information to and from a satellite network. Portable computing device 14 may also utilize the "Com.plete" PC card available from GlobeWave, Inc., of Rochelle Park, N.J., which includes a cellular phone and a phone/fax modem on a single PC card.

Portable computing device 14 may also include a Global Positioning Satellite (GPS) receiver 51, linked to the bus. The GPS receiver is configured to receive signals from orbiting satellites and determine a position of the receiver on the surface of the earth. One example of such a GPS receiver is built into the Magellan Satellite Modem, discussed above.

Portable computing device 14 is also configured to execute modem driver software which is used to configure and utilize modem 50. By adjusting the modem via the modem driver software, the modem may be configured to dial silently, such that the user cannot hear when the modem is in use. The modem also may be configured to dial the host according to a predetermined contact schedule, as described below.

Portable computing device 14 is configured to execute operating system 38 upon startup. Typically, operating system 38 is the WINDOWS operating system commercially available from Microsoft Corporation of Redmond, Wash. Alternatively, another suitable operating system, such as LINUX, MAC OS, or PALM OS, may be used. Operating system 38 is configured to display a graphical user interface (GUI) 52 on display 48, through which the user may interact with portable computing device 14. The user may use the GUI 52 to execute application programs 40 and open program data files 44 stored on portable computing device 14.

As will be described in detail below, one of the application programs 40 portable computing device 14 is configured to run is a screen-blocking program 114. Screen-blocking program 114 is configured to restrict access to the portable computer device. Screen-blocking program 114 is typically configured to display an information window 54 containing a message that the device has been locked, and a password window 56, requiring a user to enter a password 146 before gaining access to the contents of portable computing device 14. Typically, an interest holder in the portable computing device may request that the host computer 12 instruct portable computing device 14 to execute the screen-blocking program upon determining that the portable computing device 14 has a predefined status, such as MISSING, LOST, or STOLEN.

Host computer 12 typically includes a central processing unit 60, memory 62 and mass storage device 64 linked by a bus 66. Memory 62 typically includes random access memory (RAM) 68, read only memory (ROM) 70, and a basic input output system (BIOS) 72, which contains software routines necessary to start-up and operate host computer 12. The mass storage device may be a hard drive, CD ROM drive, magnetic disk drive, tape drive, or other device. Computer-readable data 74, such as an operating system 76, application program 78, program module 80, and program data 82 are typically stored on mass storage device 64, or in memory 62.

Host computer 12 is typically linked to database 18 via a network modem 84 linked to a computer network 86. Usually, the network modem 84 is located on a network card in portable computing device 14, and the computer network 86 is a LAN. Alternatively, the network modem may be a telephone modem, ISDN, DSL, cable, or other type modem, linked to a compatible network of a suitable type. In one embodiment of the invention, host computer 12 communicates with database 18 through TCP/IP protocols over the Internet.

Host computer 12 also typically is linked to communication network 16 through a plurality of modems 88. Typically, the communication network is the PSTN, and each modem connects to the PSTN via an associated telephone line 88. Typically, each of telephone lines 88 have a corresponding telephone number, which may be a toll-free number such as an 800 number. Telephone carriers pass Dialed Number Information Service (DNIS) information for 800 toll-free numbers in order to bill the call to the owner of the dialed number. From the DNIS information, host computer 12 is configured to detect the dialed telephone number to which portable computing device 14 placed the incoming call. The host computer is configured to detect the origination telephone number from which portable computing device 14 is calling, by extracting the origination telephone number from Automatic Number Identification (ANI) information associated with the incoming call. Alternatively, communication network 16 may be a wireless network, such as a cellular or satellite network, and host computer 12 may be linked to communication network 16 through a wireless modem, such as a cellular or satellite modem. In another alternative embodiment of the invention, communication network 16 may be a computer network, such as the Internet, and host computer 12 may be configured to detect the address (typically an IP address) of the portable computing device 14 when device 14 contacts host computer 12.

As shown in FIG. 4, host computer 12 typically is configured to execute operating system 76, as well as host software 94. Typically the operating system is the WINDOWS NT operating system distributed by Microsoft Corporation of Redmond, Wash. Alternatively, the LINUX operating system, or other suitable operating system may be used.

Host software 94 includes a line monitor program 96 configured to monitor incoming telephone lines from the PSTN 16 for calls placed from portable computing device 14. The line monitor program is configured to instantiate a plurality of line threads 98, each of which monitors a corresponding telephone line for an incoming telephone call from a portable computing device 14.

Host software 96 is configured to communicate with database 18. Database 18 is configured to store client data 100, a contact log 102, uploaded files 104 received from portable computing devices 14, and downloadable files 106 to be sent to portable computing devices 14 by host computer 12.

The contact log 102 typically includes a list of each contact made by the plurality of portable computing devices 14 with the host computer 12. For each contact event, the log typically includes a record of the date and time of contact, client ID, telephone number from which the call was placed, telephone number to which the call was placed, and the action taken by the host computing device.

Uploaded files 104 typically include files that have been transferred from portable computing devices 14 to host computer 12. The uploaded files may include data retrieved from a missing portable computing device, user feedback data, message delivery confirmation data, user messages, etc. Downloadable files 106 typically include executable application programs that are downloaded to portable computing devices 14, such as screen-blocking program 114 and launch program 116. Downloadable files 106 also may include program data files, such as messages encoded in the hypertext markup language (HTML), or other file types.

Portable computing device 14 is typically configured to execute an operating system 38, such as the WINDOWS operating system available from Microsoft Corporation of Redmond, Wash. The WINDOWS operating system typically includes a registry 110, which stores configuration information for hardware and software of portable computing device 14.

Portable computing device 14 also typically is configured to execute client programs 112, which are typically implemented in software, but also may be implemented in firmware 25 and/or hardware, such as in the BIOS 34 of ROM 32 on portable computing device 14. Client programs 112 will hereafter be described as client software 112 for purposes of explanation, although it will be understood that the following description also applies to client programs 112 implemented in firmware and/or hardware. Client software 112 typically runs as a service of the WINDOWS operating system, and is registered in registry 110. Alternatively, client software 112 may be executed as a "device" of the operating system, similar to a monitor device or printer device of current operating systems, and may have an accompanying device driver.

Client software 112 is configured to periodically check in with host computer 12 according to a contact schedule, shown at 176 in FIG. 7. The client software stores a copy of at least a portion of contact schedule 176 on portable computing device 14. The contact schedule on the portable computing device may be updated by downloading new schedule information from the host computer 12 at each contact between the host computer and the portable computing device. Typically, a new contact interval 180 is downloaded from host computer 12 to the portable computing device 14 every time the client software checks in with the host computer. Portable computing device 14 records the time of the most recent contact between portable computing device 14 and host computer 12, and stores it as a most recent contact time 178. Portable computing device 14 is able to calculate a next scheduled contact time 182 by adding the downloaded contact interval 180 to the most recent contact time 178. Contact schedule 176 is further described below.

Client software 112 typically includes a registration program 120 configured to receive user information, shown at 125 in FIG. 7, and detect a hardware and software configuration of portable computing device 14, shown at 168 in FIG. 7. The registration program is configured to initially contact the host and transmit to the host the gathered user information 125 and hardware and software configuration 168, as described below.

Client software 112 also typically includes a check-in program 118 that is configured to launch upon start-up of portable computing device 14. The check-in program is configured to wait until next scheduled check-in time 182, calculated as described above. At the next scheduled check-in time, the check-in program detects whether portable computing device 14 is connected to communication network 16. Typically, communication network 16 is the PSTN and detecting whether portable computing device 14 is connected to PSTN 16 includes detecting whether a dial tone is available to modem 50. Alternatively, the presence of a connection to communication network 16 may be detected in another suitable manner.

If the check-in program 118 detects that portable computing device 14 is connected to communication network 16, the check-in program proceeds to establish a connection with host computer 12, typically by initiating a direct dial connection through the PSTN to a telephone access number associated with the host device. If portable computing device 14 is not connected to communication network 16 at next scheduled check-in time 182, check-in program 118 is configured to wait for an attempt interval, shown at 188 in FIG. 7, before again attempting to contact host computer 12 via communication network 16.

Client software 112 also may include a screen-blocking program 114 and launch program 116. The screen-blocking program 114 and launch program 116 are typically downloaded from downloadable files 106 on database 18. As described below, launch program 116 is typically configured to run as a service of operating system 38 and has an associated registry entry in registry 110. Launch program 116 is configured to be executed as soon as its registry entry is created in registry 110, and upon any subsequent upon start-up of portable computing device 14. Alternatively, operating system 38 may not include a registry entry, and launch program 116 may be executed as an executable program, or in another suitable manner.

Once executed, launch program 116 is configured to execute, or launch, screen-blocking program 114. If a user attempts to exit screen-blocking program 114, launch program 116 is configured to automatically restart screen-blocking program 114. Further details regarding locking up portable computing device 14 via the launch program and screen-blocking program are discussed below in reference to FIG. 15. Alternatively, client software 112 may not include a launch program, and/or may restrict access to the portable computing device 14 in another suitable manner.

As shown in FIG. 7, client data 100 stored on database 18 typically includes a client ID 122 and a product identifier 124. Client ID 122 is typically an identification number assigned by host computer 12 to portable computing device 14. Host computer 12 assigns the client ID when the user registers the client software on portable computing device 14, as described below. Product identifier 124 is a code assigned to the particular version of client software 112 on personal computing device 14. The product identifier is used by the host to determine what type of product is installed on portable computing device 10. Usually, the client software is either a security product or an information distribution product. Alternatively, the client software may be both a security product and an information distribution product, or may be another type of product.

Client data 100 also may include user information 125. User information 125 typically includes a user name 126, user gender 128, user demographic information 130 (such as income range 132, employment type 134, and user interests 136), and user contact data 138 (such as user address 140, user phone number 142, user email address 144, and user password 146). The user demographic information is used to select appropriate messages, such as product offers or advertisements, to send to portable computing device 14, as described below.

User password 146, also shown in FIG. 4, is typically a password chosen by the user during the registration process. The password may be used to unlock the computer, or to verify the user's identity to an administrator of host computer 12, for example, when reporting the status of host computer 12. Typically, user information 125 is entered by the user via menu options on a registration menu, and is sent to host computer 12 for storage in database 18. Alternatively, the information may be sent to an administrator of host computer 12 via mail, telephone call, online form, or in a suitable alternative manner.

Client data 100 also typically includes a reported status 148 of portable computing device 14. The status of portable computing device 14 is typically reported by an interest holder in portable computing device 14. As used herein, the term "interest holder" refers to a party who has an interest in the portable computing device, such as a corporate or individual owner of the device, a lessor, lender, or other financier of the device, or a user of the device. The status may be reported via a telephone call, email, online form, or virtually any other suitable communications method.

The reported status may be virtually any status, but is typically NORMAL, MISSING, LOST, STOLEN, UNAUTHORIZED USE, MESSAGE QUEUED, PAYMENT DUE, and/or DELINQUENT. The status is NORMAL when the an interest holder such as a user has possession of the device. The status is MISSING when the portable computing device is missing from the possession of the interest holder. The status may be MISSING even if the interest holder knows where the device is located, but cannot immediately physically access or take possession of the device. This may occur, for example, when the interest holder, such as a lender, knows a particular individual has the device in his possession at his dwelling, but cannot lawfully enter the dwelling of the individual to take possession of the device.

The status of the device is LOST when the interest holder knows that the device is missing because it was lost. The status of the device is STOLEN when the interest holder knows that the device is missing because it was stolen. The status of the device may also be DELINQUENT, where an interest holder in the device has not received timely payment for the device.

The status of the device may be UNAUTHORIZED USE, for example, when the interest holder suspects that a user other than the authorized user is using the device. For example, the interest holder may detect a sudden increase in online ordering, transmission activity, or other suspicious activity, and suspect that device 14 has been used by an unauthorized user. In addition, the interest holder may determine that the geographic location of portable computing device 14 is outside of a predefined geographic region, such as region 20. Region 20 may be as small as a corporate campus, or smaller, and as large as the national boundary of a country, or larger. If the detected geographic location exceeds the predefined geographic region, the interest holder may suspect that the user is making unauthorized use of device 14 by absconding with the portable computing device, or that the device has been stolen by an unauthorized user.

The status may also be SEND MESSAGE, where the interest holder desires to send a message to the user of portable computing device 14. In addition, the status may be DOWNLOAD FILE and/or EXECUTE FILE where the interest holder desires to send a file to a user of portable computing device 14 and cause portable computing device 14 to execute the file upon receipt. The status may also be SEND BILL, SEND PAYMENT REMINDER, etc., where the interest holder desires to have the host send a bill or payment reminder to the user of portable computing device 14.

Client data 100 also typically includes one or more responsive actions 150 corresponding to each possible status 148. Typically, an interest holder in portable computing device 14 decides ahead of time the one or more corresponding responsive actions to be taken for each possible status. Alternatively, the interest holder may select an appropriate action to take upon reporting the status to the administrator of host computer 12. Actions 150 typically include a missing action 152, lost action 154, stolen action 156, message queued action 158, payment due action 160, and delinquent action 162, and may also include other predefined actions. Responsive actions 150 may also be referred to as remedial actions 150.

Typically, the responsive actions 150 are RETRIEVE FILE, DELETE FILE, LOCK-UP DEVICE, TRACK LOCATION, SEND MESSAGE, DOWNLOAD FILE, EXECUTE FILE, SEND BILL, and SEND PAYMENT REMINDER. These actions may be implemented singularly or in combination in response to a particular status. The action RETRIEVE FILE will cause host computer 12 to instruct portable computing device 14 to transfer a file located by a predetermined file-to-retrieve indicator 164 to host computer 12 for storage as an upload 104 in database 18. As used herein, the term "retrieve" is used to mean to "transfer" a file from the portable computing device to the host computer, and does not necessarily mean to "transfer and delete" the file, thereby leaving no trace of the file on portable computing device 14, although this functionality may be achieved by simultaneously instructing the portable computing device to retrieve and delete the file.

Typically the file-to-retrieve indicator 164 is a path to a file or folder on portable computing device 14. Where the exact path is not known, the file to retrieve indicator 164 may be a string representing a partial or complete file name 164a, which may include wildcard characters. The host computer is configured to instruct the portable computing device 14 to search for the file based on the partial or complete file name, and then transfer the file to the host computer. If multiple files are found, the portable computing device may be instructed to retrieve all files, or send a file list back to host computer 12, such that the interest holder may select the desired files to be retrieved.

The action DELETE FILE will cause host computer 12 to instruct portable computing device 14 to delete a file on portable computing device 14 located by a predetermined file-to-delete indicator 166. Typically the file-to-delete indicator 166 is a path to a file or folder on portable computing device 14. Where the exact path is not known, the file-to-delete indicator 166 may be a string representing a partial or complete file name 166a, which may include wildcard characters. The host computer is configured to instruct the portable computing device 14 to search for the file based on the partial or complete file name, and then delete the file from portable computing device 14. If multiple files are found, the portable computing device may be instructed to delete all files, or send a file list back to host computer 12, such that the interest holder may select the desired files to be deleted.

The action LOCK-UP DEVICE will cause host computer 12 to instruct portable computing device 14 to restrict user access to portable computing device 14. This is typically achieved by locking up the GUI 52 of the operating system 38 of portable computing device 14, as described below. Alternatively, this may be achieved by restricting the user's access privileges in another suitable manner. Typically, a password is required of the user to gain access to the portable computing device once the device is locked up. The action LOCK-UP DEVICE may also be referred to as VERIFY USER because it may be used to determine if an authorized user is using the device, when the status of device 14 is UNAUTHORIZED USE.

The action DOWNLOAD FILE causes host computer 12 to download a file to portable computing device 14. The downloaded file may be compressed by a program such as WINZIP available from NicoMac Computing of Mansfield, Conn., in which case the file is typically uncompressed after being downloaded. The action EXECUTE FILE causes host computer 12 to instruct the portable to execute a recently downloaded file. The downloaded file is executed independently if the file is an executable file, such as an application program file. If the downloaded file is a program data file, the file is executed by opening the file using a predetermined application assigned to open files of the same type as the downloaded file. This action may alternatively be referred to as OPEN FILE where another application program is used to open the downloaded file.

The action SEND MESSAGE causes host computer 12 to send a message to portable computing device 14. The message typically contains text and/or graphics, and may also contain audio content. Typically, the message file is a Hyper Text Markup Language (HTML) file, and is downloaded from host computer 12 to portable computing device 14, along with an instruction to open the file with the browser 122 of portable computing device 14. Typically, host computer 12 instructs portable computing device 14 to open the HTML file and minimize the HTML file such that it appears only at the bottom of the screen in a task bar 554 of the WINDOWS operating system GUI, as described in detail below with reference to FIGS. 17 and 18. Alternatively, the message may be of another format, and/or downloaded in another suitable manner to portable computing device 14.

The message may contain content of any suitable nature. For example, the message may be an advertisement, product offer, notice, personal message, etc. The message may be broadcast to an entire fleet of portable computing devices, to a single portable computing device, or to a predefined subset of portable computing devices.

The action SEND BILL causes host computer 12 to send a bill to portable computing device 14 via the communication network. Typically the bill is an HTML file that is opened with the browser 122 of portable computing device 14. The action SEND PAYMENT REMINDER causes host computer 12 to send a payment reminder to portable computing device 14 via communication network 16. Alternatively, the bill may be of another suitable format.

Client data 100 also includes a portable computing device hardware and software configuration 168, which typically includes a modem driver type and may also include a browser type, operating system type, available memory, available plug-in applications, and other parameters. The hardware and software configuration is typically entered by the user, or alternatively detected by the client software, during the registration process, described below.

Client data 100 also typically includes a client contact history 170, which includes telephone numbers 172 from which portable computing device 14 contacted host computer 12 in the past, and associated geographic locations 174 corresponding to telephone numbers 172. Telephone numbers 172 may be detected by the line monitor program from ANI associated with the incoming call from portable computing device 14. The geographic locations 174 may be derived by reference to a database linking particular telephone numbers with associated geographic locations, or by another suitable method. Alternatively, where the location of portable computing device 14 is detected using a GPS receiver, contact history 170 may include GPS coordinates and/or corresponding geographic locations. In another embodiment of the invention, the location may be resolved using a network address (typically an IP address) of portable computing device 14, and the contact history may include IP addresses and associated geographic locations.

Client data 100 also typically includes a contact schedule 176. Contact schedule 178 may include a most recent contact time 178, a contact interval 180, and an attempt interval 188. The most recent contact time 178 is a record of the most recent time at which contact was established between host computer 12 and portable computing device 14. The most recent contact time is updated at the host computer 12 and portable computing device 14 upon each contact between host computer 12 and portable computing device 14. Contact interval 180 is an interval at which portable computing device 14 is configured to attempt to contact host computer 12. Typically, the contact interval is adjusted at host computer 12. An updated most recent contact time 178 is typically downloaded to portable computing device 14 during each contact between host computer 12 and portable computing device 14.

From the most recent contact time 178 and contact interval 180, portable computing device 14 is configured to calculate a next scheduled contact time 182 at which portable computing device 14 is to attempt to connect to communication network 16 and contact host computer 12.

Alternatively, host computer 12 may calculate and store the next scheduled contact time 182 as a data record on database 18, and may download the next scheduled contact time 182 to portable computing device 14. If a connection cannot immediately be established at the next scheduled contact time 182, for example because portable computing device 14 is not linked to communication network 16, portable computing device 14 is configured to stop attempting and wait an attempt interval 188 before making another attempt to establish a connection with host computer 12. This process continues until a connection is eventually established.

Contact schedule 176 may also include a next contact telephone number 184, which is a telephone access number associated with host computer 12 that portable computing device 14 is configured to call at the next scheduled contact time 182. Typically, the telephone access number is a toll-free number, such as an 800 number. The contact schedule may also include a backup contact telephone number 186. Typically, the next contact telephone number 184 and backup contact telephone number 186 are stored on portable computing device 14 during registration, and may be updated during each contact between host computer 12 and portable computing device 14. Contact number 184 may be changed, for example, when the status of portable computing device 14 changes to MISSING, LOST, or STOLEN, and a dedicated telephone line may be used by portable computing devices with these or other predetermined statuses.

Alternatively, contact schedule 176 instead may be a periodic or non-periodic schedule of another form. For example, portable computing device 14 may be programmed with a contact schedule causing the device 14 to contact the host computer 12 on a monthly, daily, hourly, or random basis.

Figure 8:
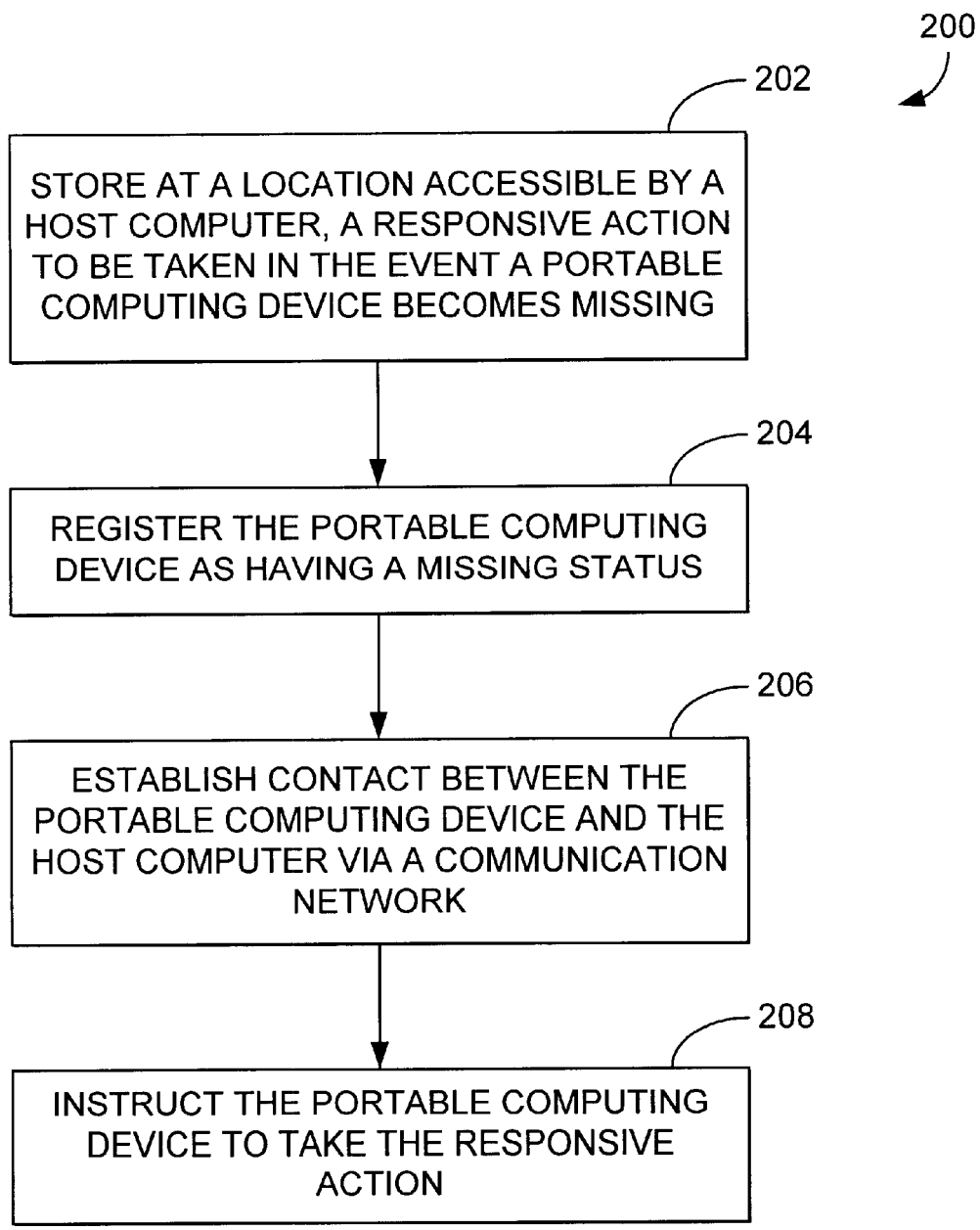
FIG. 8 is a flowchart of a method for communicating between a host computer and a portable computing device according to one preferred embodiment of the present invention.

In FIG. 8, one preferred embodiment according to the present invention of a method for communicating between a host computer and a client computing device is shown generally at 200. Method 200 typically includes, at 202, storing at a location accessible by host computer 12, a responsive action 150 to be taken in the event that portable computing device 14 becomes missing. Typically, responsive action 150 is received by an administrator of host computer 12 from an interest holder in portable computing device 14 via telephone call, online form, email, or other suitable communication method, and is stored in database 18 associated with host computer 12.

At 204, the method includes registering portable computing device 14 as having a missing status. Typically, the administrator at host computer 12 is informed of the missing status of portable computing device 14 by an interest holder in the portable computing device via a telephone call, online form, email, or other suitable communication method, and stores the missing status in database 18 associated with the host computer. Alternatively, host computer 12 may be configured to detect that portable computing device 14 is missing, for example if it loses track of the device for a predetermined period of time, such as one month. In addition, portable computing device 14 itself may be able to detect that it is missing, and communicate this fact to host computer 12. For example, portable computing device 14 may report itself as missing. This may be accomplished by the portable computing device detecting via its onboard GPS receiver that it has traveled outside a predetermined geographic region.

At 206, the method includes establishing contact between portable computing device 14 and host computer 12 via a communication network 16. Typically, contact is established according to a contact schedule 176, as described above. Therefore the method may also include before establishing contact, determining a contact schedule, and configuring portable computing device 14 to contact host computer 12 via communications network 16 periodically according to contact schedule 176.

The contact is typically established via a telephone network such as the PSTN. Alternatively, the telephone network may be a wireless network such as a cellular or satellite network. While typically portable computing device 14 initiates a call to host computer 12, it will be understood that the host computer may also initiate contact by calling, for example, the cellular telephone number associated with a cellular modem of the portable computing device.

At 208, the method includes instructing the portable computing device to take the responsive action 150. Responsive action 150 may be virtually any action, and may for example include retrieving data from portable computing device 14, deleting data from portable computing device 14, restricting access to portable computing device 14, or determining a geographic location of portable computing device 14, as described above.

Figure 9:
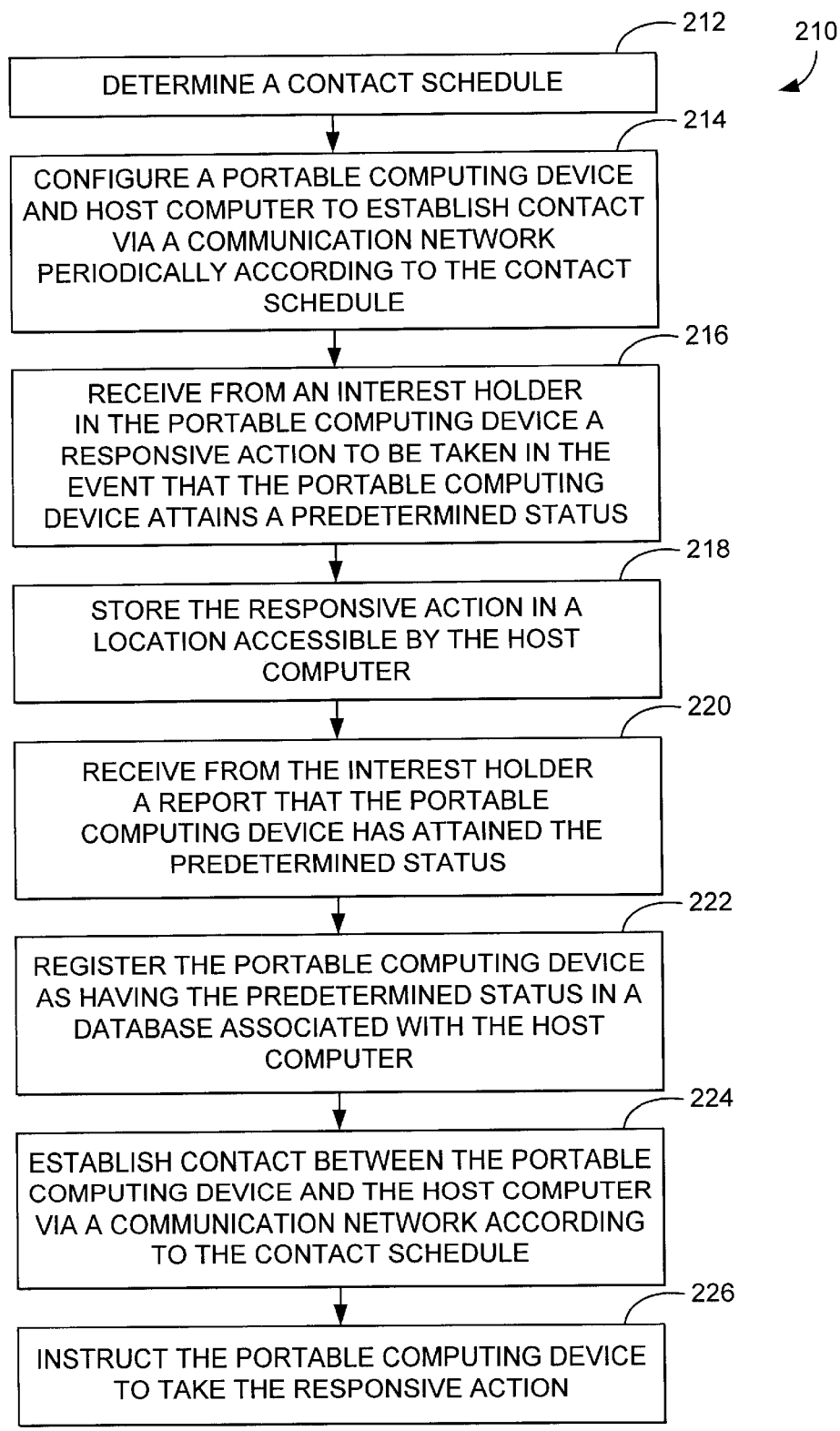
FIG. 9 is a flowchart of a method for communicating between a host computer and a portable computing device according to another preferred embodiment of the present invention.

In FIG. 9, another preferred embodiment according to the present invention of a method of communicating between a portable computing device 14 and a host computer 12 is shown generally at 210. At 212, the method typically includes determining a contact schedule 176, as described above. At 214, the method typically includes configuring portable computing device 14 and host computer 12 to establish contact via a communication network 16 periodically according to contact schedule 176. Typically, this is accomplished by installing a check-in program 118 on portable computing device 14 that periodically causes the portable computing device to contact the host computer according to the contact schedule. Alternatively, contact schedule 176 may be kept at host computer 12 and the host computer may be configured to initiate contact according to the contact schedule.

At 216, the method typically includes receiving from an interest holder in portable computing device 14 a responsive action 150 to be taken in the event that the portable computing device attains a predetermined status 148. As described above, responsive action 150 is typically communicated to an administrator at host computer 12 via a telephone call, email, online form, or other suitable communication method. At 218, the method typically includes storing responsive action 150 in a location accessible by host computer. Typically, the responsive action is stored in database 18.

At 220, the method typically includes receiving from the interest holder a report that the portable computing device has attained the predetermined status 148. The report of status is also typically communicated to an administrator at host computer 12 via a telephone call, email, or online form. Alternatively, the status 148 and responsive action 150 described above are processed automatically by the host computer, and no administrator is involved. For example status 148 and responsive action 150 may be submitted via an online form and processed automatically by host computer 12. At 222, the method typically includes registering the portable computing device as having the predetermined status 148 in a database 18 associated with host computer 12. Status 148 may be virtually any status, including NORMAL, MISSING, LOST, STOLEN, UNAUTHORIZED USE, MESSAGE QUEUED, PAYMENT DUE, DELINQUENT, etc. as described above.

At 224, the method typically includes establishing contact between portable computing device 14 and host computer 12 via communication network 16 according to contact schedule 176. Contact is typically made via a telephone network, however wireless networks, such as satellite and cellular networks, and/or computer networks, such as the Internet, may also be used, as described above. At 226, the method typically includes instructing portable computing device 14 to take responsive action 150. Responsive action 150 may be virtually any action, and may for example include retrieving data from portable computing device 14, deleting data from portable computing device 14, restricting access to portable computing device 14, or determining a geographic location of portable computing device 14, tracking the location of portable computing device 14, sending a message to portable computing device 14, downloading a file to portable computing device 14, sending a bill or payment reminder to portable computing device 14, or verifying the user of portable computing device 14, as described above.

The method may also include receiving user demographic information, for example during a registration process, and selecting a message or file to download based upon the user demographic information. The method may also include sending a confirmation from the portable computing device to the host computer that the user has performed an action related to the message, such as reading the message, printing the message, or paying a bill. The method may also include sending user feedback, such as a text message, from the portable computing device to the host computer, in response to the downloaded message from host computer 12.

Figure 10:
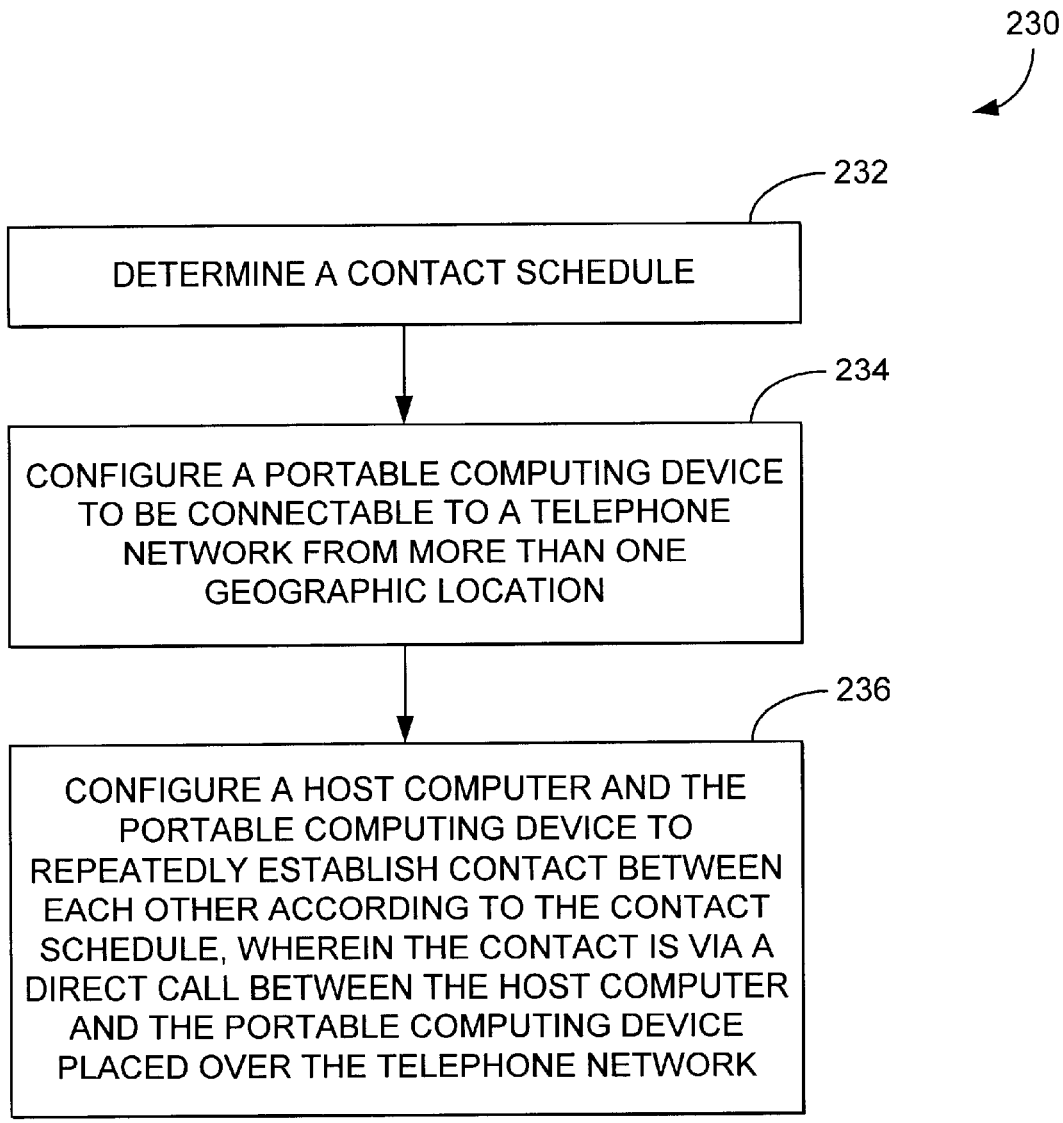
FIG. 10 is a flowchart of a method for communicating between a host computer and a portable computing device according to another preferred embodiment of the present invention.

In FIG. 10, another preferred embodiment according to the present invention of a method for communicating between a host computer 12 and a portable computing device 14, wherein the portable computing device is consecutively positioned in a plurality of geographic locations, is shown generally at 230. At 232, the method typically includes determining a contact schedule 176, as described above. At 234, the method typically includes configuring portable computing device 14 to be connectable to a telephone network from more than one of the geographic locations, as described above. At 236, the method typically includes configuring host computer 12 and portable computing device 14 to repeatedly establish contact between each other according to contact schedule 176, wherein the contact is via a direct call between the host computer and the portable computing device placed over the telephone network. The telephone network typically is the public switched telephone network.

Figure 11:
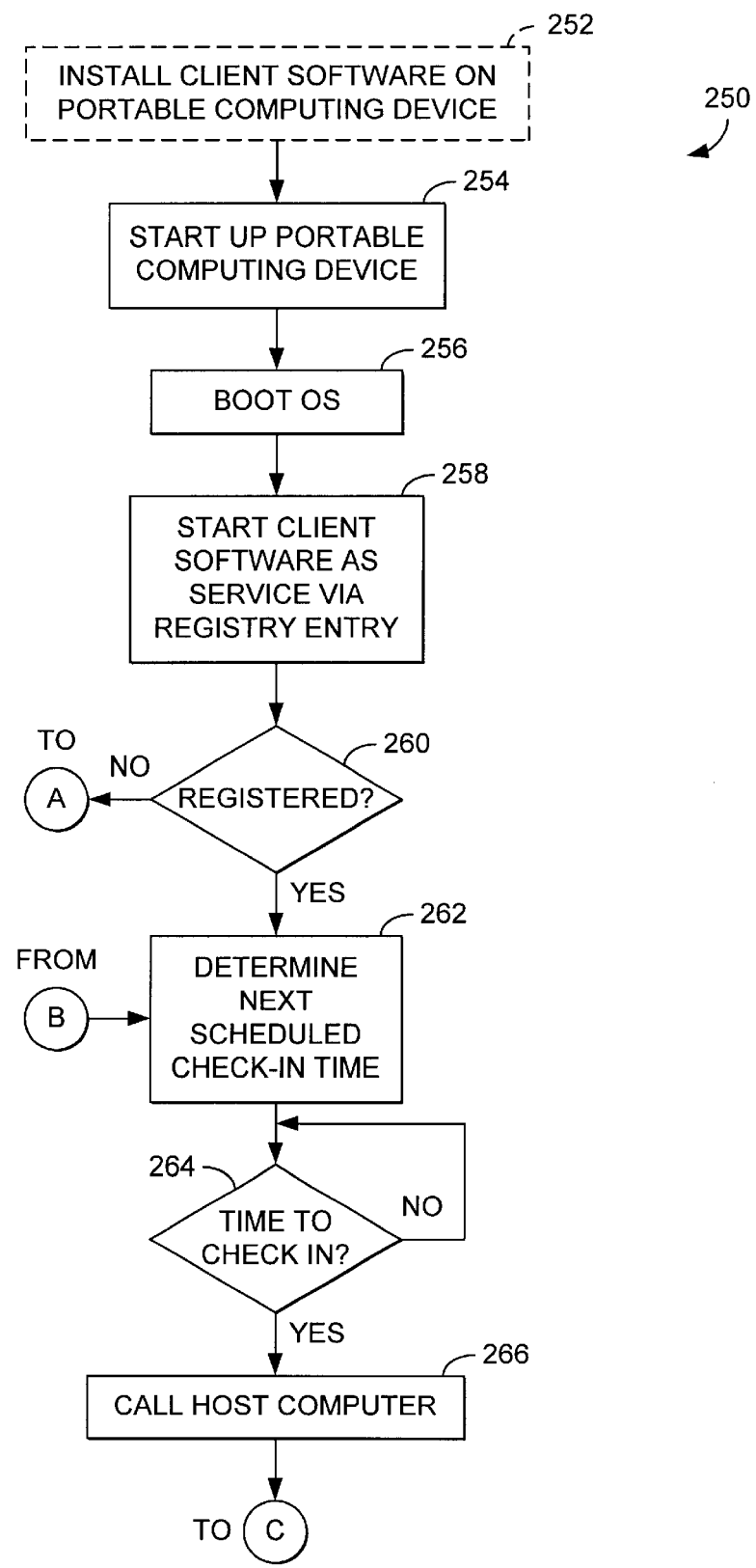
FIG. 11 is a flowchart of a method for communicating between a host computer and a portable computing device according to another preferred embodiment of the present invention.

In FIG. 11, another preferred embodiment according to the present invention of a method for communicating between a host computer and a portable computing device is shown generally at 250. At 252, the method typically includes installing the client software on portable computing device 14. This is typically done by an interest holder in portable computing device 14. Where the interest holder is the owner or user of the portable computing device 14, the interest holder typically installs the software after purchasing the portable computing device. Where client software 112 is used by a financier to track collateral or a lessor to track leased assets, the client software may be installed on portable computing device 14 before the device is delivered to the purchaser/lessee of the device, and configured to surreptitiously contact host computer 12 periodically, until the financier's or lessor's interest is extinguished in the device. Typically, surreptitious contact is achieved by causing the modem to dial silently, without interrupting any activity of the user on portable computing device 14.

At 254, the method includes starting up portable computing device 14, and at 256 the method includes booting up operating system 38 of portable computing device 14. At 258, the method typically includes starting the client software 112 as a service of the operating system, via a registry entry in registry 110 of operating system 38. Alternatively, the client software 112 may be in firmware 25 or ROM BIOS 34 routines executed on start-up of portable computing device 14.

At 260, the method typically includes determining whether the client software is registered. If the client software is registered, at 262 the method includes determining the next scheduled check-in time 182. As described above, portable computing device 14 typically stores most recent contact time 178 and contact interval 180, from which portable computing device 14 is configured to calculate the next scheduled contact time 182.

At 264, portable computing device 14 typically determines whether it is time to check in, that is, whether the current time, as measured from an internal clock on portable computing device 14, indicates that the next scheduled contact time 182 has arrived. If it is not yet time to check in, the method typically includes waiting until the next scheduled contact time 182 arrives. If it is time to check in, at 266 the method typically includes contacting host computer 12 from portable computing device 14 via telephone network 16. Alternatively, the contact may be made through a wireless network such as a cellular or satellite network, or through a computer network such as the Internet, as described above.

Host computer 12 alternatively may be configured to call portable computing device 14. In this case, portable computing device 14 typically has a wireless modem 50 disposed thereon, as described above. The wireless modem may be addressable and have an associated wireless interface 53 with a portable computing device telephone access number through which host computer 12 may establish communication with portable computing device 14.

To call host computer 12, portable computing device 14 detects whether portable computing device 14 is connected to communication network 16. If not connected, portable computing device 14 waits an attempt interval 188, and again detects whether or not it is connected to communication network 16. This process may be repeated several times until a connection is detected with communication network 16, at which point portable computing device 14 contacts host computer 12, typically by placing a call to the next contact telephone number 184 via communication network 16.

Figure 12:
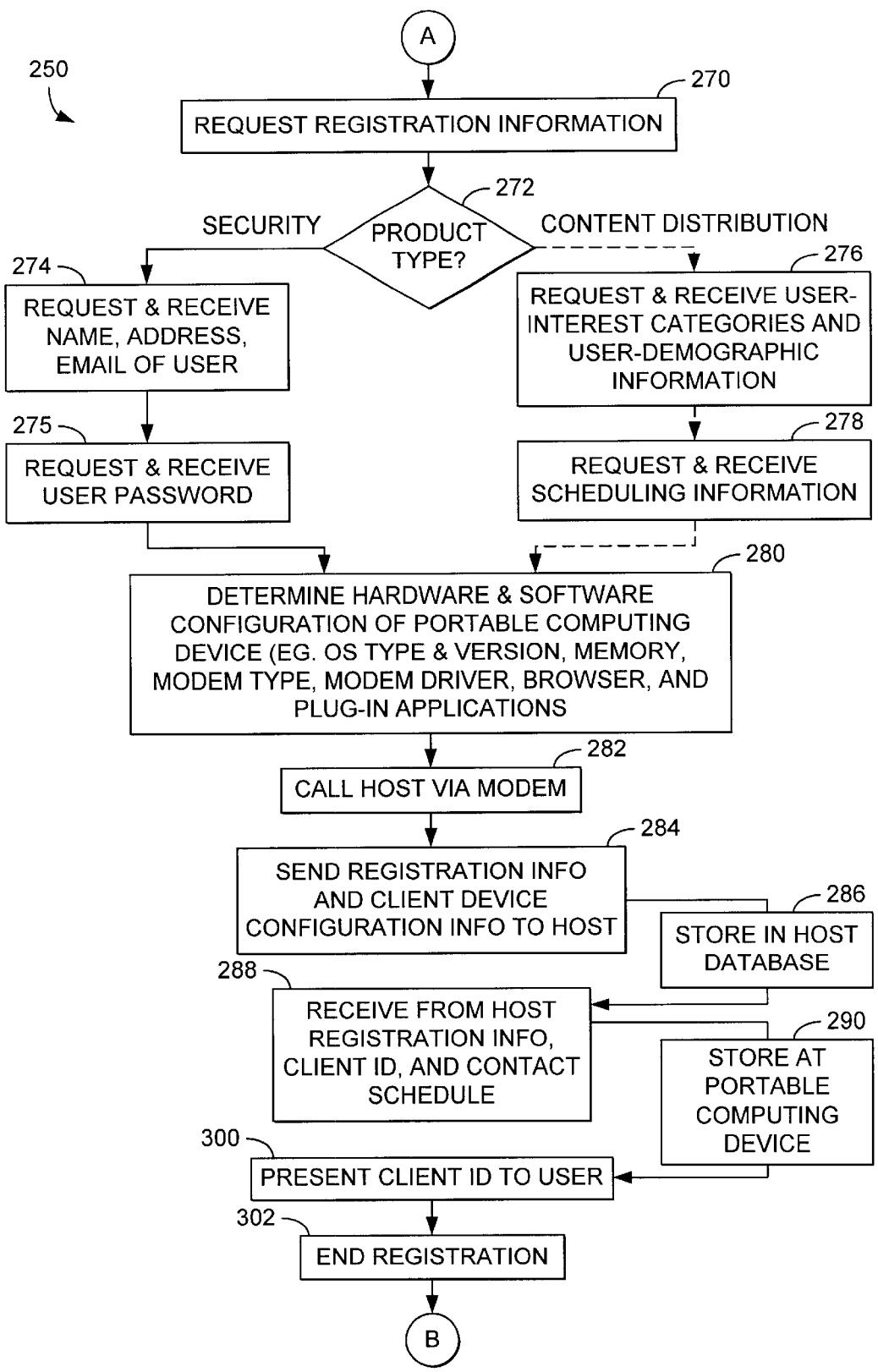
FIG. 12 is a continuation of the flowchart of FIG. 11.

As shown in FIG. 12, if it is determined at 260 that the client software 112 is not registered, the method 250 typically further includes requesting registration information at 270 via registration program 120. The registration program may gather different information depending on the type of client software 112 installed on portable computing device 14. Therefore, at 272 the method typically includes detecting whether client software 112 is of a predetermined type. This is typically accomplished by referencing a product identifier 124 stored within the client software. The product identifier 124 is later transferred to host computer 12 and stored in client data 100 on database 18.

The product identifier typically indicates that the client software 112 is a security product, or a content distribution product. Alternatively, the product identifier may indicate that client software 112 is both a security product and a content distribution product, or shares particular features of each. Typically, the security product has features such as determining if a portable computing device is missing and retrieving and deleting data, tracking the location of the portable computing device, and locking up the portable computing device. The content distribution product is typically used to distribute messages and other content from host computer 12 to portable computing device 14, as described below.

If the client software is a security product, the method includes, at 274, requesting and receiving at portable computing device 14 user information 125, including the user name 126, user address 140, user email 144, and other user information 125 described above. At 275, the method typically includes requesting and receiving a user password 146 from the user. Although the term "use" is used with reference to user information 125, it will be understood that where an interest holder such as a corporation is using the client software to communicate with a portable computing device, the method may include requesting and receiving information such as the name, address, email, password, etc. of the interest holder.

If the client software is a content distribution product, the method typically includes, at 276, requesting and receiving user information 125 such as income range 132, employment type 134, user interests 136, and other user demographic information 130. At 278, the method typically includes requesting and receiving scheduling information from the user, indicating how often the user desires that portable computing device 14 and host computer 12 establish contact for the purposes of distributing information. It will be understood that the security product may also be a content distribution product used to distribute information and messages, and the method may include all of steps 274, 275, 276, and 278. For example, the method may be used by a lessor with a fleet of leased portable computing devices to secure and send a message to each of its lessees through the leased portable computing devices, or by a corporation to send a newsletter to each of its employees through their portable computing devices.

At 280, the method includes determining a hardware and software configuration 168 of portable computing device 14. This typically includes determining the operating system type and version, the available memory, the modem type, the modem driver, the browser type and version, and the type of plug-in applications available for use by the browser. In addition, other hardware and software parameters may be included in hardware and software configuration 168.

At 282, the method typically includes calling host computer 12 via the modem 50 of portable computing device 14 through communications network 16. Typically, the call is placed via the PSTN, although a wireless network such as a cellular or satellite network may also be employed. At 284, the method typically includes sending the registration information gathered in steps 274–278 and the hardware and software configuration 168 of portable computing device 14 detected in step 280 to host computer 12. At 286, the method typically includes storing the registration information and hardware and software configuration of portable computing device 14 in the database 18 associated with host computer 12.

At 288, the method includes sending from host computer 12 and receiving at portable computing device 14 the registration information, as well as an associated client ID and contact schedule information. As described above, the contact schedule information sent to portable computing device 14 typically includes a contact interval 180, next contact telephone number 184, backup telephone number 186, and attempt interval 188. At 290, the method includes storing the registration information, and associated client ID and contact schedule, in memory 24 or on mass storage device 26 of portable computing device 14. At 300, the method typically includes presenting the client ID to the user via a menu created by the client software. The user may utilize the client ID when communicating with host computer 12, for example, to report a change in status of portable computing device 14.

Figure 13:
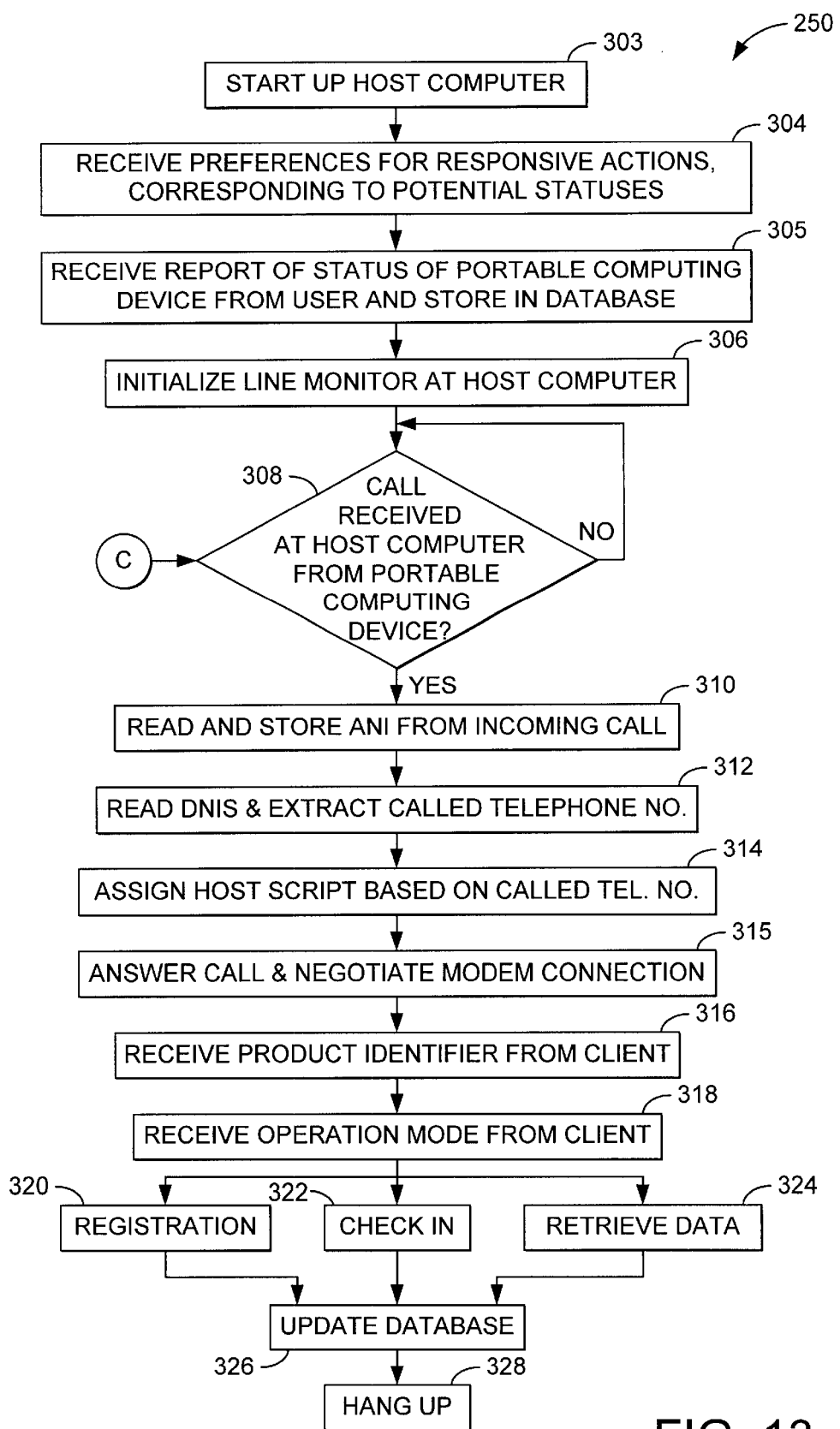
FIG. 13 is a continuation of the flowchart of FIG. 12.

Turning now to FIG. 13, a continuation of method 250 is shown from the perspective of host computer 12. At 303, the method includes starting up host computer 12, associated operating system 76, and host software 94. At 304, the method includes receiving one or more responsive actions 150 corresponding to a potential status 148 of the portable computing device. Typically, responsive action 150 is received from an interest holder in portable computing device 14. Responsive action 150 may be a missing action 152, lost action 154, message queued action 158, payment due action 160, delinquent action 162, or virtually any other action corresponding to a status of the portable computing device, as described above. Responsive action 150 is stored in a location accessible by host computer 12, such as on database 18.

At 305, the method also includes receiving a report of the status 148 of portable computing device 14 from an interest holder, in portable computing device 14. Typically, the status report is received via a telephone call to an administrator associated with host computer 12, although an online form, email, or other suitable communication method may also be used, as described above. After status 148 is received, the method includes storing the reported status 148 in client data 100 on database 18. The process of storing status 148 on database 18 is one way to accomplish registering the portable computing device 14 as having a missing status. Alternatively, the status may be registered in other data files or registers associated with client software 112. For example, the client software may define a missing flag and set the flag to positive, etc. It will be understood that while typically the reported status 148 is registered after responsive action 150 is stored, alternatively the responsive action may be stored after the status is reported. For example, an owner may call to report the status of portable computing device 14 as stolen, and may call back later to indicate a responsive action 150 to take.

At 306, the method includes initializing a line monitor program 96 on host computer 12, and instantiating one or more line threads 98 configured to monitor incoming lines from communication network 16 for calls from remotely located portable computing devices 14. At 308, the method includes determining whether a call has been received from portable computing device 14. At 310, the method includes reading and storing automatic number information from the incoming call from portable computing device 14. At 312, the method includes extracting the dialed telephone number from the DNIS information associated with the incoming telephone call.

At 314, the method may include assigning a predefined script at the host based upon the dialed telephone number. For example, if portable computing device 14 dials a telephone number reserved for stolen devices, the predefined script may be tailored to retrieve data as quickly as possible from portable computing device 14. At 315, the method includes answering the call and negotiating a modem connection between modem 50 of portable computing device 14 and modem 88 of host computer 12. Alternatively, where portable computing device 14 includes a cellular phone, satellite modem, or other addressable wireless interface device, steps 305–315 may be omitted. In this case, host computer 12 may contact the portable computing device via the wireless interface device. The contact may be according to a contact schedule maintained at host computer 12, or may be made immediately upon a change in reported status.

At 316, the method typically includes receiving a product identifier 124 from the client software 112 on portable computing device 14. Host computer 12 may use this product identifier to tailor further interactions with portable computing device 14 to the particular type of client software installed on portable computing device 14.

At 318, the method includes receiving an operation mode form the client. Typically, the operation mode is either REGISTRATION, CHECK-IN, or RETRIEVE DATA, although other operation modes may be defined. If the operation mode is REGISTRATION, then, at 320, the portable computing device and host computer proceed through the registration process described with reference to FIG. 12. If the operation mode is CHECK-IN, then, at 322, portable computing device 14 proceeds to check in with host computer 12, which process will be described in detail below.

If the operation mode is RETRIEVE DATA, at 324, the method includes retrieving data from portable computing device 14 and storing the data as an upload 104 on database 18 associated with host computer 12. Typically, the RETRIEVE DATA mode is entered into upon interruption of a previous data retrieval action. For example, if portable computing device 14 is reported missing, and host computer 12 instructs the device to transfer several large files to host computer 12, the connection may be lost between the host computer and portable computing device before the files are fully retrieved. In this case, portable computing device 14 is configured to reconnect with host computer 12 in RETRIEVE DATA mode to complete the data transfer.

Once the corresponding operation at 320, 322, or 324 has been completed, host computer 12, at 326, typically updates client data 100 in database 18 to reflect the completed operation. For example, host computer 12 typically updates the contact history 170 and most recent contact time 178 in client data 100. At 328, the method includes terminating the connection between host computer 12 and portable computing device 14, typically by hanging up.

Figure 14:
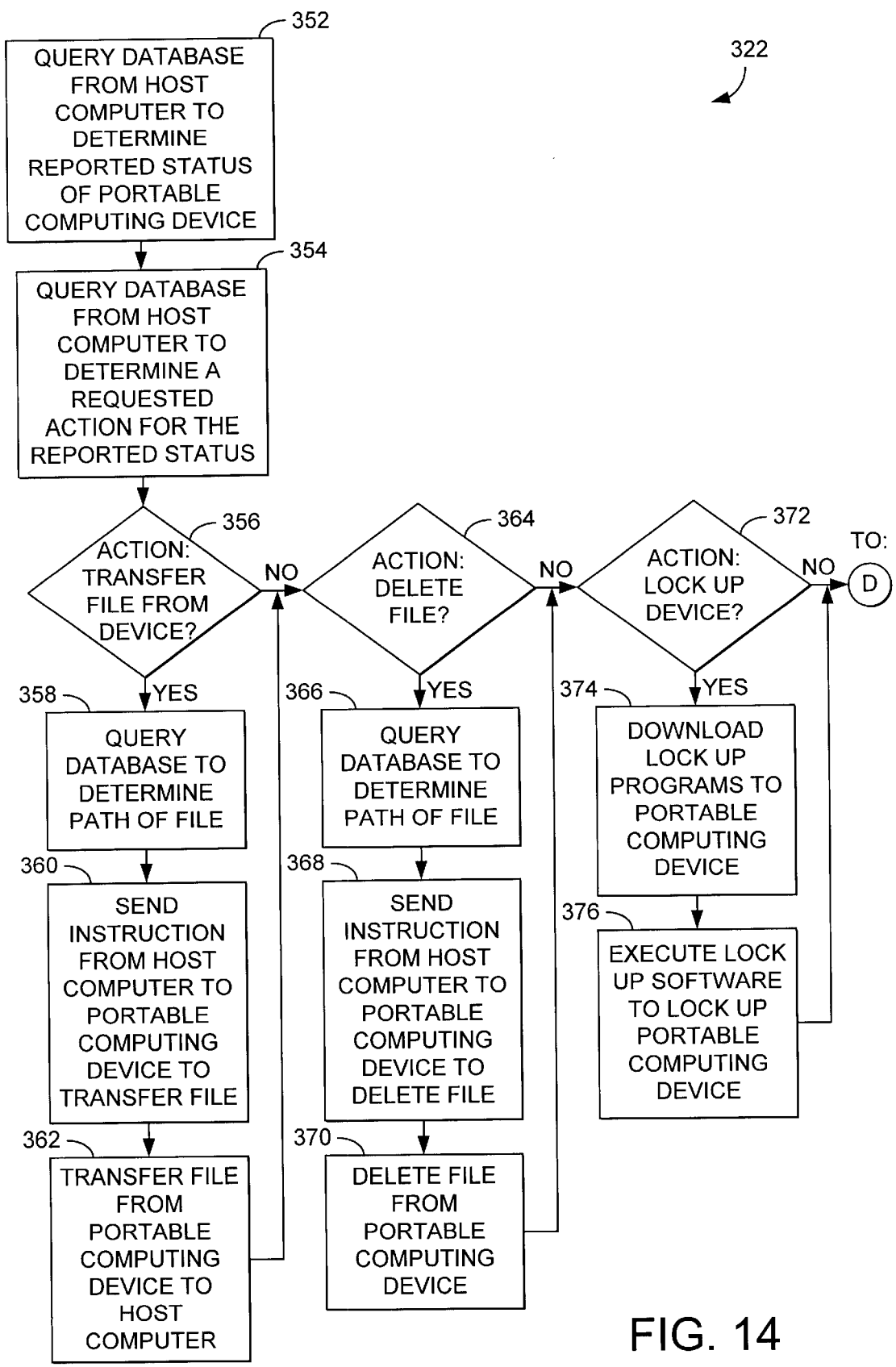
FIG. 14 is a flowchart showing the step of checking in of FIG. 13.

In FIG. 14, checking in at 322 in method 250 is shown in detail. Checking in at 322 may include querying database 18 from host computer 12 to determine the reported status 148 of portable computing device 14. At 354, the method includes querying database 18 from host computer 12 to determine a requested action 150 associated with the status 148.

At 356, the method includes determining whether the requested action is RETRIEVE FILE. If so, the method further includes, at 358, querying database 18 to determine a path 164 of a file to retrieve. Path 164 may also point to a folder, or group of files. At 360, the method typically includes sending an instruction from host computer 12 to portable computing device 14 to transfer the file from portable computing device 14 to host computer 12 via the communication network 16. At 362, the method includes transferring the file at path 164 from portable computing device 14 to host computer 12. The file is typically stored as an uploaded file 104 on database 18.

At 364, the method includes determining whether the requested action is DELETE FILE. If so, the method further includes querying database 18 to determine an indicator or path 166 of a file to delete. Path 166 may also point to a folder, or group of files. At 368, the method typically includes sending instructions from host computer 12 to portable computing device 14 to delete the file. At 370, the method typically includes deleting the file located at the path 166.

At 372, the method typically includes determining whether the requested action is LOCK UP DEVICE. Alternatively, at 372 the method may determine whether the requested action is VERIFY USER, because, as described above, locking up the device and requiring the user to enter a password is one way to verify that an authorized user is using portable computing device 14. If the requested action is LOCK UP DEVICE or VERIFY USER, the method typically includes, at 374, downloading program files configured to lock up portable computing device 14 from host computer 12 to portable computing device 14. Typically these files include screen-blocking program 114 and launch program 116. At 376, the method includes executing the lock-up programs to lock up portable computing device 14, thereby restricting user access to portable computing device 14. Restricting user access at 376 may be accomplished via the process discussed below with reference to access restriction method 450 of FIG. 17. Alternatively, user access may be restricted in another predetermined manner, for example, by limiting user access privileges via operating system 38.

Figure 15:
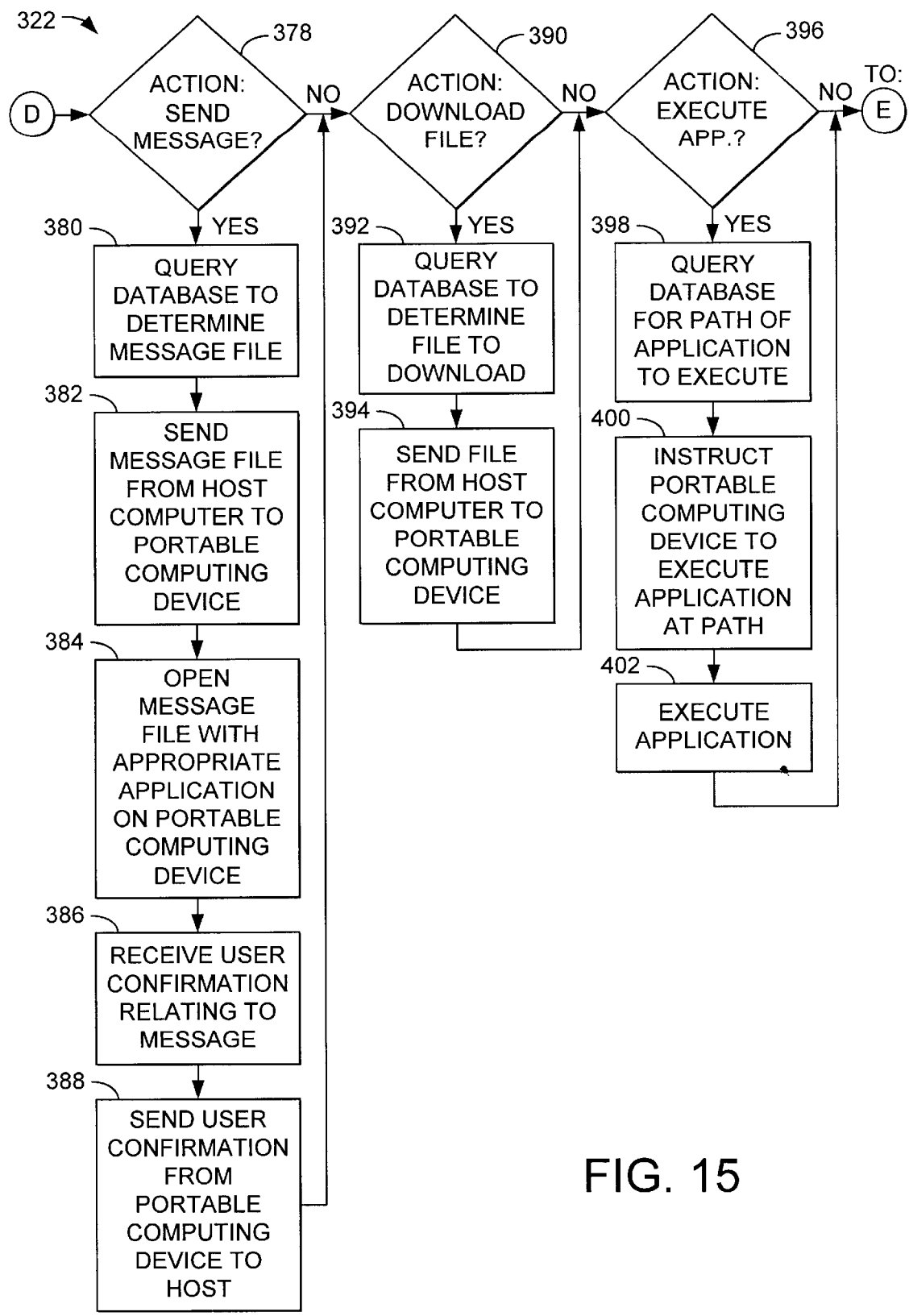
FIG. 15 is a continuation of the flowchart of FIG. 14.

As shown in FIG. 15, at 378, the method typically includes determining whether the requested action is SEND MESSAGE. If so, at 380 the method typically includes querying database 18 to determine a message file to send to portable computing device 14. Typically, the message file is stored as a downloadable file 106, in HTML format. Alternatively another format, such as an image format or portable document format may be utilized.

At 382, the method includes sending the message file from host computer 12 to portable computing device 14 via communication network 16. At 384, the method includes opening the message file with an appropriate application on portable computing device 14. The message may be opened into a message window, such as message window 560 in FIG. 19. Host computer 12 has been informed during registration (discussed above) of the plug-in application programs that are stored on portable computing device 14, and typically only sends files that may be opened by one of these applications. The message may be configured to be printed from portable computing device 14.

At 386, the method includes receiving user input, or feedback, related to the message. The user feedback received at 386 related to the message may also be referred to as a user confirmation, because it may confirm the user has performed an action related to the message. Typically, the user confirmation is triggered by the user selecting a selector, shown at 561a in FIG. 19, positioned in message window 560 to confirm that the user has read the message. At 388, the method includes sending a confirmation to host computer 12 from portable computing device 14 that the user has indicated that the message was read. Alternatively, the user confirmation may indicate that the user has printed the message via a print selector 561b, or that the user has paid a bill by via a payment selector 561d. In addition, the user may choose selector 561c to enter textual feedback in a feedback window.

At 390, the method includes determining whether the requested action is DOWNLOAD FILE. If so, at 392 the method includes querying database 18 to determine an appropriate downloadable file 106 to download. At 394, the method typically includes instructing the portable computing device to download the appropriate file from host computer 12 to portable computing device 14 via communication network 16.

At 396, the method includes determining whether the requested action is EXECUTE APPLICATION. If so, the method includes, at 398, querying database 18 for a path of the application to execute on portable computing device 14 and, at 400, instructing portable computing device 14 to execute the application at the path. Host computer 12 may also instruct portable computing device 14 to search for an application having a partial or complete filename, and execute the application if found. The downloaded file may be virtually any type of file. For example, the downloaded file may be an executable file configured to update client software 112 with new product features, settings, or other data. Alternatively, the method may include downloading an application file and contemporaneously instructing portable computing device 14 to execute the downloaded application. At 402, the method typically includes executing the application.

Figure 16:
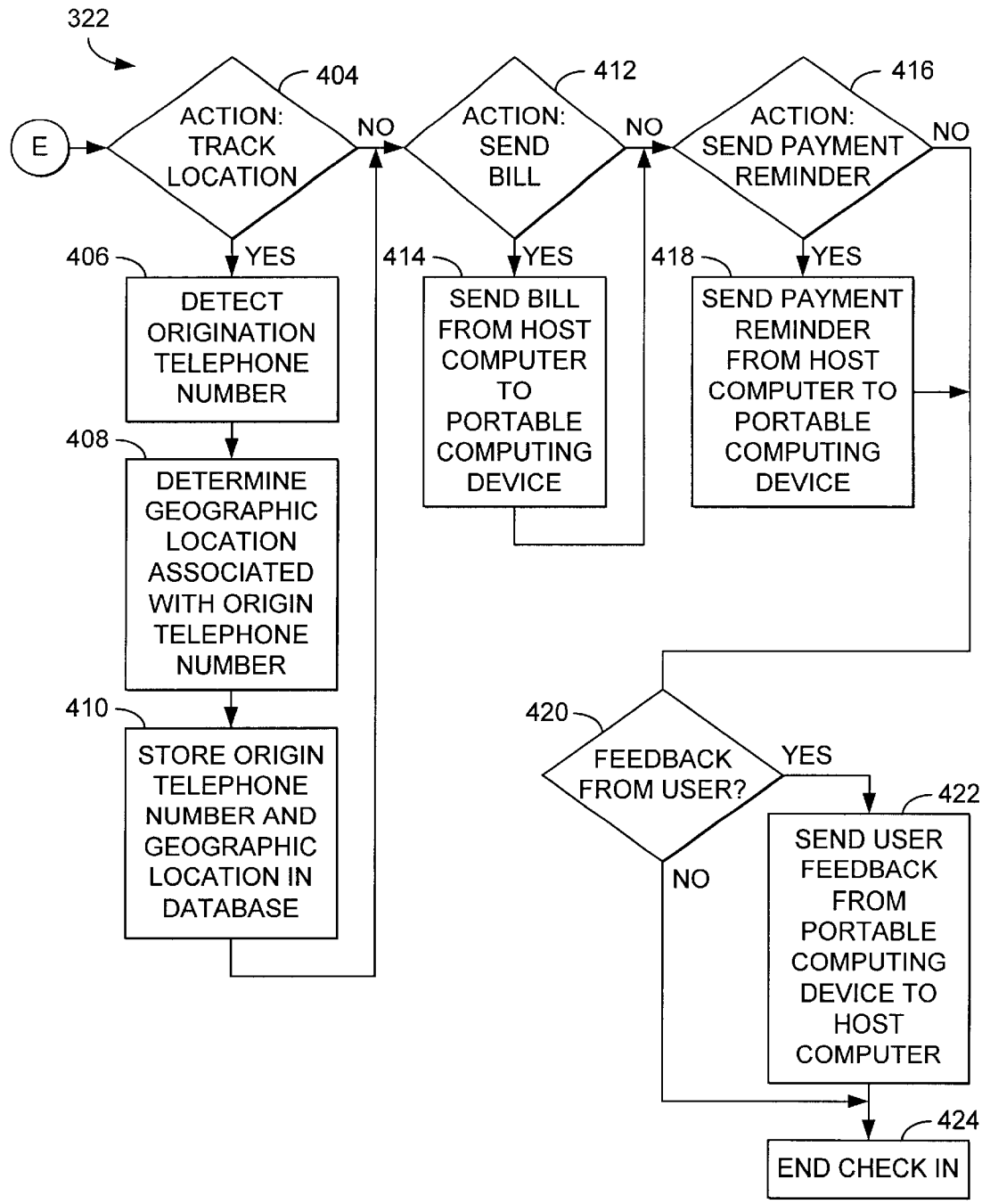
FIG. 16 is a continuation of the flowchart of FIG. 15.

As shown in FIG. 16, at 404, the method includes determining whether the requested action is TRACK LOCATION. If so, at 406 the method typically includes detecting origination telephone number 172 from the ANI associated with the incoming telephone call from portable computing device 14. At 408, the method includes determining a geographic location 174 associated with the origination telephone number detected at 406. Typically, this is accomplished by referencing a database containing an index of telephone numbers and associated geographic location indicators, such as addresses and/or zip codes. At 410, the database includes storing the origin telephone number 172 corresponding geographic location 174 in client data 100 on database 18. Alternatively, the method may include determining the geographic location of the portable computing device by receiving satellite signals at GPS receiver 51, and calculating a corresponding geographic location based upon the satellite signals. In yet another embodiment of the invention, portable computing device 14 is contacts host computer 12 via the Internet the method includes tracking the IP address of the portable computing device.

At 412, the method may include determining whether the requested action is SEND BILL. If so, at 414 the method includes sending a bill from host computer 12 to portable computing device 14. The bill may be a message in HTML format as described above, or may be in some other alternative format, and may include a hypertext link, shown at 561*d* in FIG. 19, to a method of payment, such as an electronic payment processing center.

At 416, the method may include determining whether the requested action is SEND PAYMENT REMINDER. If so, at 418 the method typically includes sending a payment reminder from host computer 12 to portable computing device 14 via the communications network. The payment reminder may be a message in HTML format, as described above, or may be in some other alternative format, and may include a selector, such as a hypertext link 561*d*, to a method of payment, such as an electronic payment processing center.

At 420, the method typically includes determining whether there is any user feedback to return to host computer 12. User feedback may include a message the user desires to send to the host administrator. In one embodiment of the invention, the user selects a selector 561*c* on message window 560 to cause user feedback window 563 to appear, and enters a message in the user feedback window 563. For example, in response to a payment reminder displayed in window 560, the user may enter feedback in the form of a note explaining why the user is delinquent in making payments for portable computing device 14. Alternatively, the user feedback may be a report in a change of status for portable computing device 14. For example, the user feedback may indicate that portable computing device 14, while once reported lost, has now been found.

At 422, the method includes sending user feedback from portable computing device 14 to host computer 12. Once the user feedback is received by the host, at 424, the method typically includes ending the check-in process.

Figure 17:
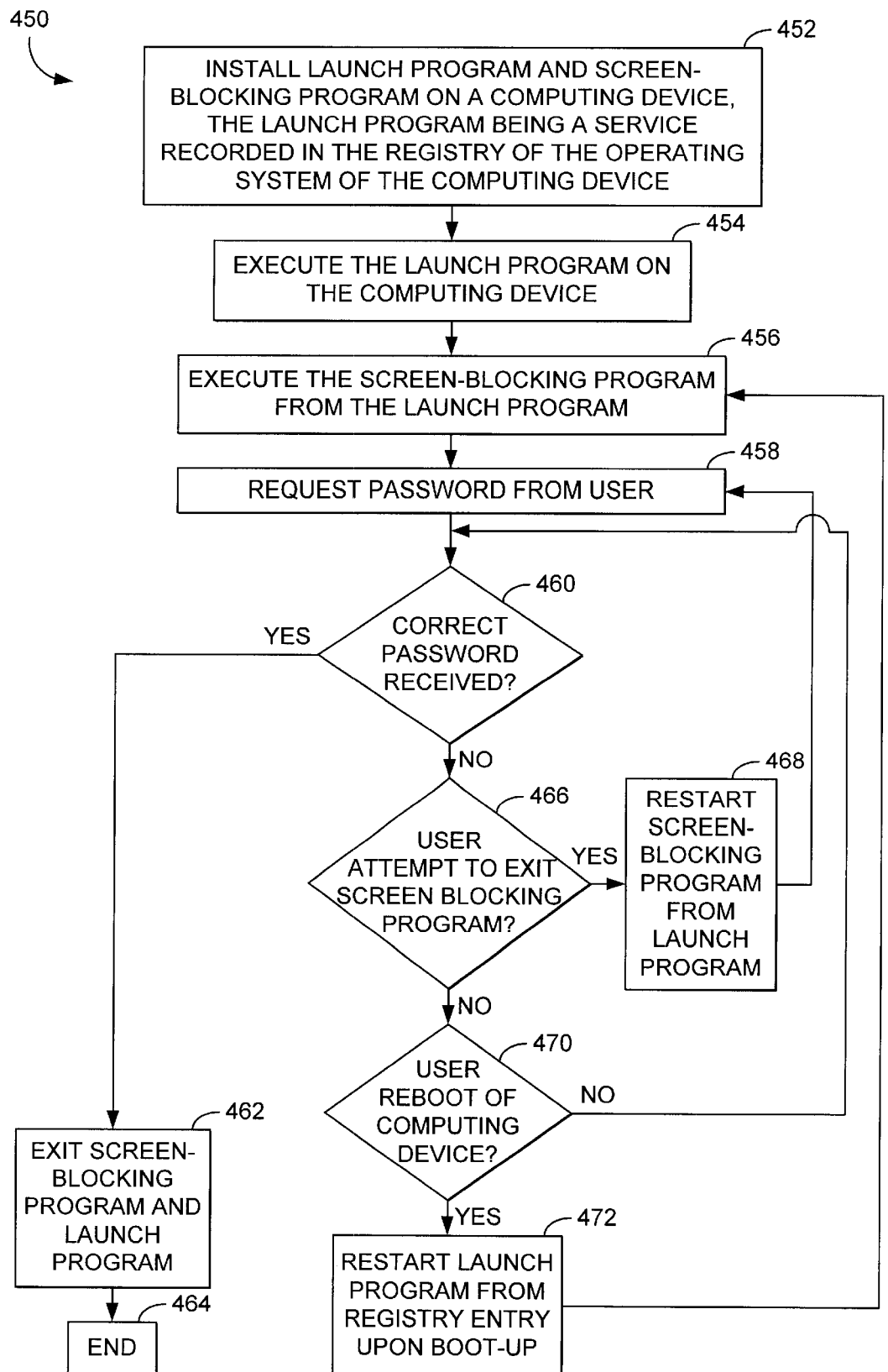
FIG. 17 is a flowchart of a method of restricting user access to a computing device according to one preferred embodiment of the present invention.

Turning now to FIG. 17, a method for restricting access to a computing device is shown generally at 450. Although the method 450 may be practiced on virtually any computing device having a display, the method 450 will be described for exemplary purposes with reference to portable computing device 14. The method 450 typically includes, at 452, installing a launch program 116 and a screen-blocking program 114 on a computing device, such as portable computing device 14. The screen-blocking program 114 and launch program 116 may be downloaded from host computer 12 to computing device 14 prior to installation on device 14.

Launch program 116 is configured to be executed automatically upon installation and thereafter upon startup of portable computing device 14, as described above. Typically, the launch program is a service of the operating system and is registered in registry 110 of the operating system. The launch program is configured to cause the screen-blocking program 114 to be executed.

At 454, the method includes executing the launch program 116 on portable computing device 14. At 456, the method includes executing the screen-blocking program 114 from the launch program. The screen-blocking program grabs the focus of the GUI 52 of the operating system 38 of portable computing device 14, and prevents a user from interacting with the GUI to access the files and folders contained on portable computing device 14. The method may include displaying an information window 54, as shown in FIG. 4, containing a message that portable computing device 14 has been locked.

At 458, the method includes requesting a password, illustrated at 58 in FIG. 4, from the user. The password is typically requested via a password window 56. At 460, the method includes determining whether the correct password has been received at portable computing device 14. If so, the method includes, at 462, exiting screen-blocking program 114 and exiting launch program 116, to thereby allow the user access to portable computing device 14. At 464, the method of restricting user access to portable computing device 14 ends.

At 466, if the correct password was not received at 460, the method further includes detecting a user attempt to exit screen-blocking program 114, for example by pressing CTRL-ALT-DEL combination of keys in the WINDOWS operating system environment. If the user attempts to exit the screen-blocking program, at 468, the method includes restarting screen-blocking program 114 from launch program 116, and again requesting a password for the user.

At 468, the method includes determining if the user has rebooted portable computing device 14. If so, at 472 the method includes restarting the launch program, typically from the registry entry upon boot-up of operating system 38 of portable computing device 14. Launch program 116 then proceeds to cause screen-blocking program 114 to execute, thereby again restricting user access to portable computing device 14.

Figure 18:
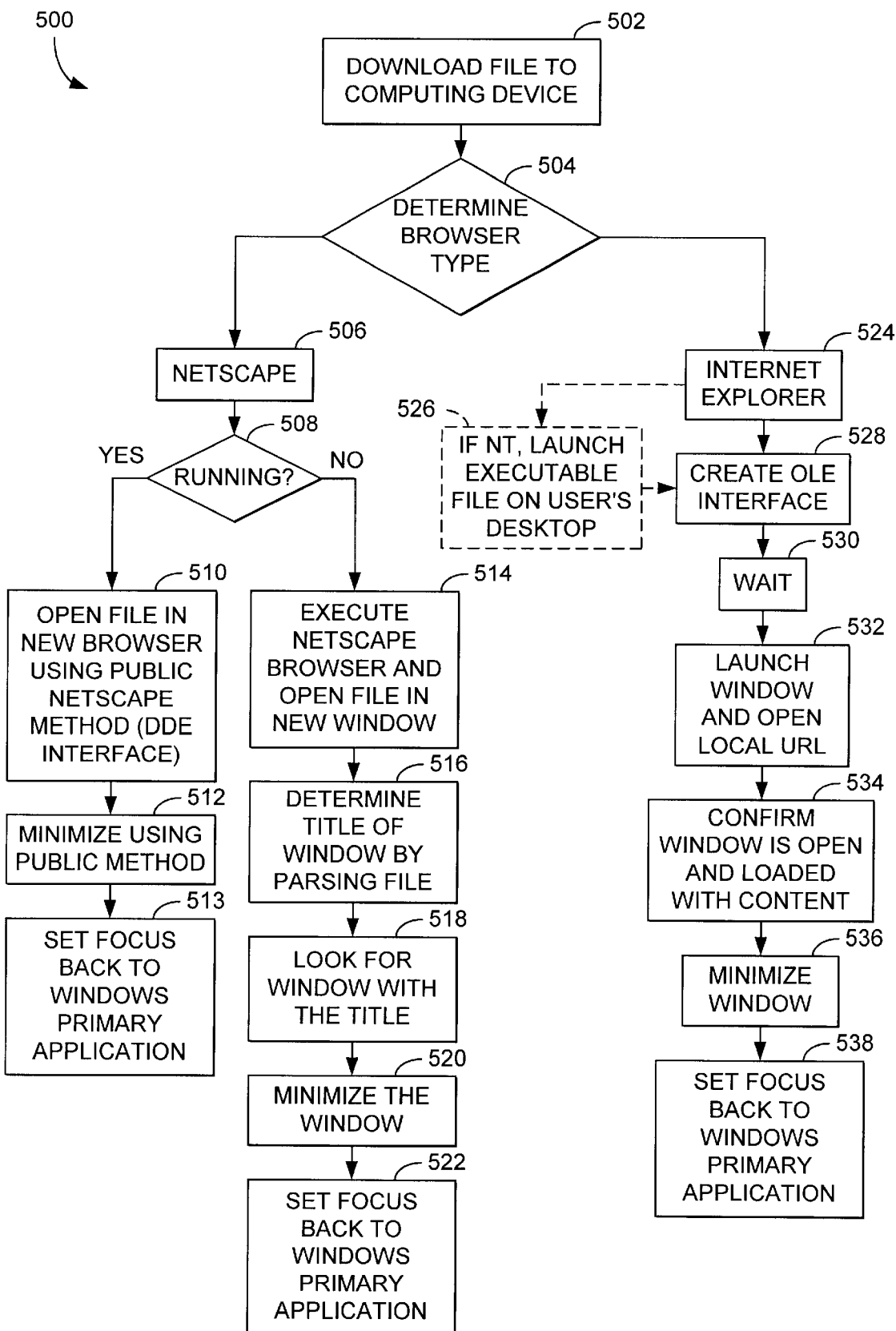
FIG. 18 is a flowchart of a method of sending a message from a host computer to a client computing device according to one preferred embodiment of the present invention.
Figure 19:
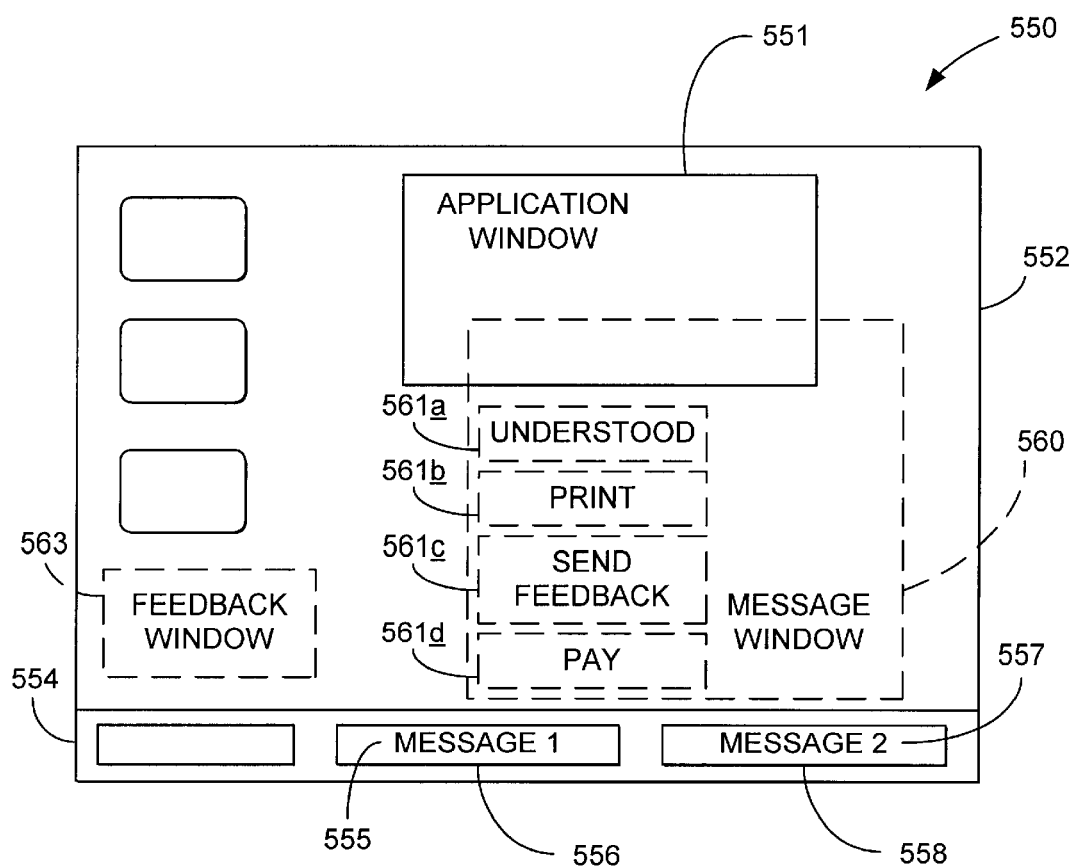
FIG. 19 is a schematic view of a screen of a computing device according to one preferred embodiment of the present invention.

FIG. 19 shows a screen 550 of a client computing device including a GUI 552 of an operating system of client computing device 14. Typically, the operating system is the WINDOWS operating system and GUI 552 is configured to display a WINDOWS primary application 551. Primary application 551 has the focus of the operating system prior to the implementation of the method embodiment 500 described below with reference to FIG. 18. GUI 552 also includes a task bar 554.

According to another embodiment of a method according to the present invention, described below, a message may be downloaded from host computer 12 to portable computing device 14 and displayed directly on taskbar 554, without opening a window that is viewable on screen 550. Thus, a user may receive a message such as message 554 or 556, without being interrupted from working with primary application 551. A brief title 555, 557 of the message may be displayed within in the graphical icons associated with each message 556, 558 in the task bar 554. Upon selecting one of the graphical icons, a corresponding message window 560 appears in GUI 552, and displays detailed contents of the message to the user. Selectors 561a–561d are provided for the user to respond to the message. By choosing selector 5611a, the user may confirm that the message has been read, which information may be transmitted as user feedback to host computer 12, as described above. By choosing selector 561b, the user may print the message, and trigger a print confirmation to be sent to host computer 12, as described above. By choosing selector 561c, the user triggers a feedback window 563 to open, in which the user may enter user feedback to be sent to host computer 12, as described above. By choosing selector 561d the user may enter payment information and pay an outstanding bill electronically. Selection of selector 561d may trigger a hyperlink to an electronic payment processing center, or may trigger an online form to be filled out and securely sent to host computer 12 from portable computer device 14, or may trigger another suitable payment mechanism.

Turning now to FIG. 18, a method according to another preferred embodiment of the present invention for sending a message from host computer 12 to a client computing device and displaying the message directly on the task bar 554 of the client computing device is shown generally at 500. The method may be implemented between host computer 12 and virtually any client computing device configured to execute GUI 522 with a task bar 554. The method will be described with reference to portable computing device 14, although it will be understood that the client computing device need not be portable.

At 502, the method includes downloading a file from host computer 12 to portable computing device 14. Typically the file is an HTML file, readable by browser 122. At 504, the method typically includes determining a browser type of browser 122. Typically the browser type is determined during registration at 280 in FIG. 12, and stored in client data 100. If the browser type is determined to be NETSCAPE (a browser commercially available from Netscape Corporation of Mountain View, Calif.) at 506, the method further includes determining at 508 whether the NETSCAPE browser is running or not. If the NETSCAPE browser is running on portable computing device 14, then the method includes, at 510, opening the downloaded file in a new browser using Dynamic Data Exchange (DDE) protocols integrated within the WINDOWS operating system.

At 512, the method includes minimizing the file window to the task bar 554 before the window is viewable on screen 550 using a public WINDOWS method. At 513, the method includes setting the focus of the operating system back to the primary application 551.

If it is determined at 508 that the NETSCAPE browser is not running, then the method includes, at 514, executing the NETSCAPE browser application and opening the downloaded file in a new window. At 516, the method next includes determining the title of the window by parsing the downloaded file for the title. This is typically accomplished by searching for the text between the HTML codes<title>and </title>. Once the title of the window is determined, the method, at 518 includes looking for a window with the same tide, and at 520, minimizing the window with same the title to the task bar 554 before the window is viewable on screen 550. At 522, the method includes setting the focus of the WINDOWS operating system back to the WINDOWS primary application, shown at 551 in FIG. 19.

If it is determined at 504 that the browser type is INTERNET EXPLORER (a browser commercially available from Microsoft Corporation of Redmond, Wash.), the method proceeds to determine whether the operating system of portable computing device 14 is WINDOWS NT. If so, the method launches an executable file on the user's desktop at 526. At 528, the method includes creating an Object Linking and Embedding (OLE) interface to an INTERNET EXPLORER browser. At 530, the method includes waiting until the browser has been initialized.

At 532, the method includes launching the window and opening the downloaded file at a local Uniform Resource Locator (URL) address on portable computing device 14. At 534, the method includes confirming the window is open and has content loaded from the file into the window. At 536, the method includes minimizing the opened window to the task bar before the window is displayed on the screen of the computing device, typically before the content is finished loading into the window from the file. At 538, the method includes setting the focus of the operating system GUI back to the primary application 551. Because INTERNET EXPLORER does not display an opened window while content is being loaded into the window, the present method is able to minimize the window after content has started being loaded into the window, but before the window is displayed to the user, thereby resulting in a seamless opening of the window directly to the taskbar.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A method of communicating between a portable computing device and a host computer, the method comprising:
   storing a plurality of possible responsive actions that may be taken by the portable computing device in the event that the portable computing device is reported missing, the responsive actions being stored at a location accessible by the host computer and remote from the portable computing device;
   at the host computer, receiving from an interest holder in the portable computing device, a report indicating that the portable computing device is missing;
   at the host computer, in response to the report, registering the portable computing device as having a missing status;
   at the host computer, designating at least one responsive action, from the plurality of responsive actions, to be taken by the portable computing device upon registration of the missing status, wherein the designated responsive action includes retrieving data from the portable computing device;
   establishing contact between the portable computing device and the host computer via a communication network; and
   sending an instruction from the host computer to the portable computing device, instructing the portable computing device to take the responsive action;
   at the portable computing device, executing at least a portion of the designated responsive action.

2. The method of claim 1, wherein the designation of the designated responsive action is made in response to an instruction from an interest holder of the portable computing device.

3. The method of claim 2, wherein the instruction to take the responsive action is received via a telephone call from the interest holder.

4. The method of claim 2, wherein the instruction to take the responsive action is received via a request sent over a computer network from the interest holder.

5. The method of claim 1, wherein the responsive action is stored in a database associated with the host computer.

6. The method of claim 1, wherein the report is received before registering the portable computing device as having a missing status.

7. The method of claim 1, wherein registering includes storing the missing status in a database associated with the host computer.

8. The method of claim 1, wherein the missing status is lost.

9. The method of claim 1, wherein the missing status is stolen.

10. The method of claim 1, further comprising:
    before establishing contact, determining a contact schedule; and
    configuring the portable computing device to contact the host computer via the communications network periodically according to the contact schedule.

11. The method of claim 10, further comprising determining a next scheduled contact time according to the contact schedule.

12. The method of claim 11, further comprising detecting whether the portable computing device is connected to the communications network at the next scheduled contact time.

13. The method of claim 12, further comprising if the portable computing device is connected to the communications network at the next scheduled contact time, then establishing a connection between the host computer and the portable computing device via the communications network.

14. The method of claim 12, further comprising if the portable computing device is not connected to the communications network at the next scheduled contact time, then waiting an attempt interval, and again detecting whether the portable computing device is connected to the communications network.

15. The method of claim 10, wherein the portable computing device is configured to contact the host computer from a plurality of geographic locations, according to the contact schedule.

16. The method of claim 1, wherein the communication network is a telephone network, and establishing contact includes placing a call from the portable computing device to a telephone access number associated with the host computer via the telephone network.

17. The method of claim 1, wherein the communication network is a wireless communication network and the portable computing device includes a wireless modem.

18. The method of claim 17, wherein the wireless communication network is a satellite communication network, and the wireless modem is a satellite modem.

19. The method of claim 1, wherein establishing contact is accomplished without user intervention.

20. The method of claim 1, wherein establishing contact includes configuring the modem of the portable computing device to operate silently.

21. The method of claim 1, further comprising:
    before establishing contact, receiving from an interest holder in the portable computing device an indication of data to be retrieved from the portable computing device.

22. The method of claim 21, further comprising:
    storing in a database associated with the host, a path of the indicated data on the portable computing device, wherein retrieving the indicated data includes transferring from the portable computing device to the host computer the data located at the path.

23. The method of claim 22, wherein a file is located at the path.

24. The method of claim 22, wherein a folder is located at the path.

25. The method of claim 1, wherein the designated responsive action includes deleting data from the portable computing device.

26. The method of claim 25, further comprising, before establishing contact, receiving from an interest holder in the portable computing device an indication of data to be deleted from the portable computing device.

27. The method of claim 26, further comprising, storing in the database associated with the host, a path of the indicated data on the portable computing device, wherein deleting the indicated data includes deleting the data located at the path.

28. The method of claim 27, wherein a file is located at the path.

29. The method of claim 28, wherein a folder is located at the path.

30. The method of claim 1, wherein the designated responsive action includes restricting access to the portable computing device.

31. The method of claim 30, wherein restricting user access includes requiring a password to gain access to the portable computing device.

32. The method of claim 30, wherein restricting user access to the portable computing device includes executing a screen-blocking program on the portable computing device.

33. The method of claim 32, wherein the portable computing device includes an operating system having a graphical user interface, and the screen-blocking program is configured to capture the focus of the graphical user interface.

34. The method of claim 32, further comprising, before executing the screen-blocking program, executing a launch program configured to trigger execution of the screen-blocking program, wherein executing the screen-blocking program includes executing the screen-blocking program from the launch program.

35. The method of claim 34, wherein the screen-blocking program and launch program are downloaded from the host computer to the portable computing device after establishing contact.

36. The method of claim 34, wherein restricting user access includes, if the screen-blocking program is exited by a user, restarting the screen-blocking program from the launch program.

37. The method of claim 34, wherein the launch program is executed automatically upon start-up by an operating system of the portable computing device.

38. The method of claim 34, wherein the launch program is registered as a service of an operating system of the portable computing device.

39. The method of claim 1, wherein the designated responsive action is determining a location of the portable computing device.

40. The method of claim 39, wherein determining a location of the portable computing device includes detecting an origination telephone number from which the portable computing device includes calling the host computer.

41. The method of claim 40, wherein determining a location of the portable computing device includes determining the location using the detected telephone number.

42. The method of claim 39, wherein the portable computing device includes a global positioning satellite receiver, and determining a location of the portable computing device includes detecting the geographic location of the portable computing device using the global positioning satellite receiver.

43. A method of communicating between a portable computing device and a host computer, the method comprising:
  determining a contact schedule;
  configuring the portable computing device and host computer to establish contact via a communication network periodically according to the contact schedule;
  receiving from an interest holder in the portable computing device an indication of a responsive action to be taken in the event that the portable computing device has a missing status;
  storing the responsive action in a location accessible by host computer and remote from the portable computing device;
  receiving from the interest holder a report that the portable computing device has the missing status;
  registering the portable computing device as having the missing status in a database associated with the host computer;
  establishing contact between the portable computing device and the host computer via a communication network according to the contact schedule; and
  sending instructions from the host computer to the portable computing device instructing the portable computing device to take the responsive action, wherein the portable computing device at least partially executes the responsive action, and wherein the responsive action includes retrieving data from the portable computing device.

44. The method of claim 43, wherein the responsive action includes deleting data from the portable computing device.

45. The method of claim 43, wherein the responsive action includes restricting access to the portable computing device.

46. The method of claim 43, wherein the responsive action includes determining a geographic location of the portable computing device.

47. The method of claim 43, where the status is delinquent.

48. The method of claim 47, wherein the responsive action includes displaying a payment reminder on the portable computing device.

49. The method of claim 47, wherein the responsive action includes restricting access to the portable computing device.

50. The method of claim 47, wherein the responsive action includes determining a geographic location of the portable computing device.

51. The method of claim 43, where the status is payment due.

52. The method of claim 51, wherein the responsive action includes displaying a bill on the portable computing device.

53. The method of claim 43, wherein the responsive action includes displaying a message on the portable computing device.

54. The method of claim 53, further comprising:
  before displaying the message, receiving user demographic information from a user of the portable computing device; and
  selecting the message based on the user demographic information.

55. The method of claim 53, wherein the message includes an advertisement.

56. The method of claim 53, further comprising:
  receiving confirmation at the portable computing device that the user has viewed the message; and
  transmitting the confirmation to the host computer via the communication network.

57. The method of claim 43, wherein the responsive action includes downloading a file to the portable computing device.

58. The method of claim 57, wherein the responsive action further includes opening the downloaded file with an associated application program on the portable computing device.

59. The method of claim 57, wherein the downloaded file is an executable application program file, and the responsive action further includes executing the downloaded file on the portable computing device.

60. The method claim 43 wherein the portable computing device including an operating system having a graphical user interface with a task bar, and wherein the responsive action includes downloading a file to the portable computing device, the method further comprising:

downloading a file from the host computer to the client computing device via a communication network; and opening the file directly to the task bar without user intervention.

61. The method of claim 60, wherein during downloading and opening the file directly to the task bar, the file is never viewable in an unminimized window on the graphical user interface of the client computing device.

62. The method of claim 60, wherein the file is opened by a browser on the client computing device.

* * * * *